(12) United States Patent
Nakamura et al.

(10) Patent No.: US 6,650,448 B2
(45) Date of Patent: Nov. 18, 2003

(54) OBSERVATION OPTICAL SYSTEM USING VOLUME HOLOGRAM

(75) Inventors: Tohru Nakamura, Hachioji (JP); Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/749,569

(22) Filed: Mar. 16, 2001

(65) Prior Publication Data

US 2002/0063913 A1 May 30, 2002

(30) Foreign Application Priority Data

Sep. 29, 2000 (JP) ........................................ 2000-302873

(51) Int. Cl.[7] ............................................... G02B 5/32
(52) U.S. Cl. ........................... 359/15; 359/16; 359/643; 359/630; 359/631
(58) Field of Search ............................. 359/15, 16, 19, 359/630, 631, 633, 636, 640, 639, 638

(56) References Cited

U.S. PATENT DOCUMENTS 5,706,136 A    1/1998   Okuyama et al.
6,222,677 B1 * 4/2001   Budd et al. .................. 359/630
6,331,916 B1 * 12/2001  Mukawa ....................... 359/630

FOREIGN PATENT DOCUMENTS

EP            0 687 932 A2    12/1995

OTHER PUBLICATIONS

Mukawa et al., "Novel Virtual Image Optics for Reflective Microdisplays," 20th International Display Research Conference, Sep. 25–28, 2000, pp 96–99.

* cited by examiner

Primary Examiner—John Juba
Assistant Examiner—Fayez Assaf
(74) Attorney, Agent, or Firm—Pillsbury Winthrop LLP

(57) ABSTRACT

An observation optical system comprises an image display element 5 and an eyepiece optical system which introduces an image formed by the image display element 5 to a center of an eye of an observer without forming an intermediate image, so as to allow the observer to observe the image as a virtual image. The eyepiece optical system is constructed and arranged to bend the optical axis using reflecting surfaces so as to be compact. The optical axis lies in a plane, with respect to which the optical system is formed symmetric. The optical system includes a prism 3 having an entrance surface $3_3$, a plurality of curved reflecting surfaces $3_1, 3_2$ and an exit surface $3_1$. The reflecting surface $3_2$ is provided with a volume hologram (HOE) 4. Whereby, it is possible to provide an image observation optical system which can be made compact enough to be usable as an image display unit for a cellular phone or a portable intelligent terminal, and which can achieve high image definition and wide field angle while controlling chromatic aberration of magnification to be small.

10 Claims, 23 Drawing Sheets

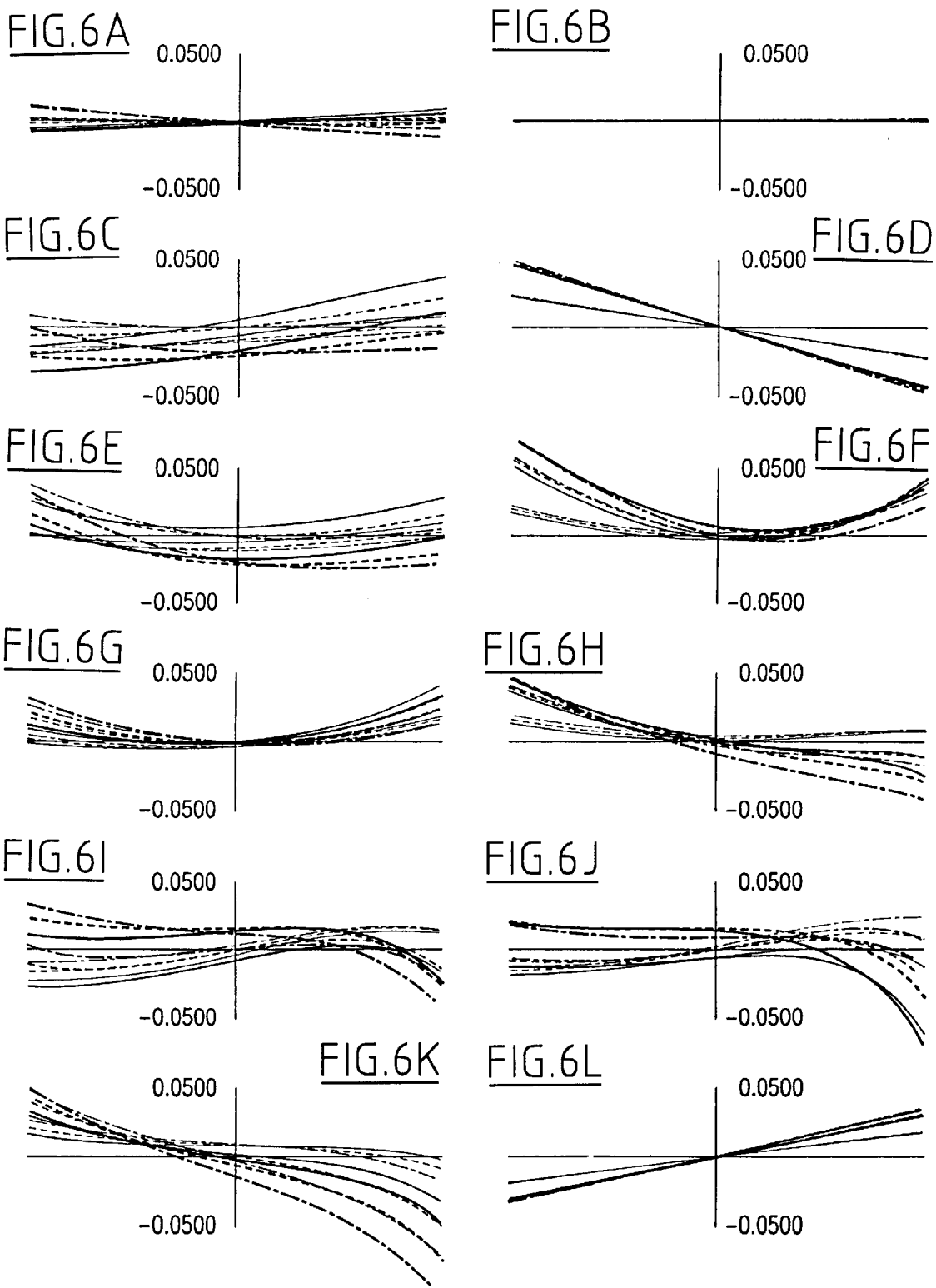

—— 650.0 NM   —— 540.0 NM   —— 490.0 NM
------ 630.0 NM   ------ 520.0 NM   ------ 470.0 NM
—·— 610.0 NM   —··— 500.0 NM   —··— 450.0 NM

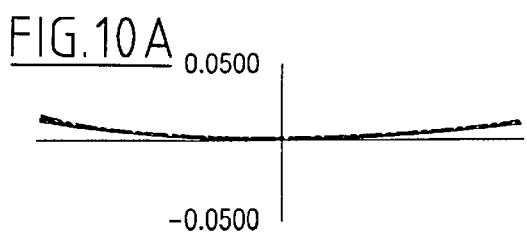
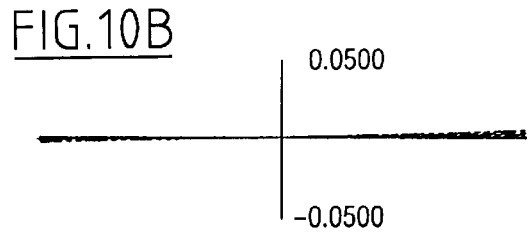
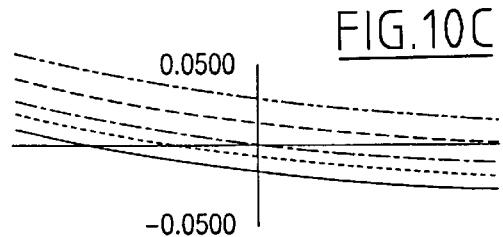
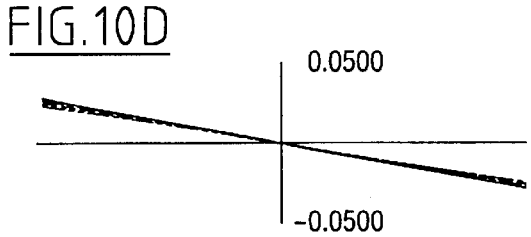
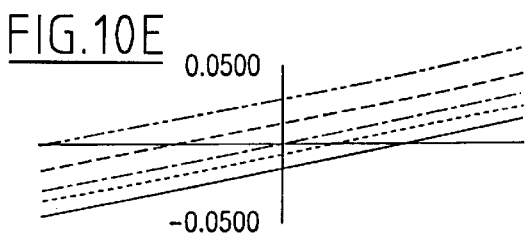
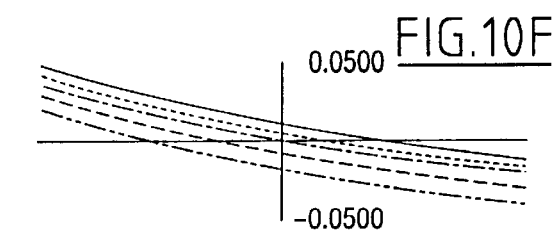
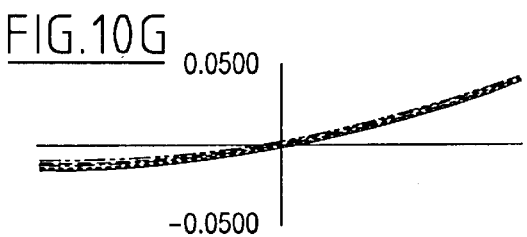
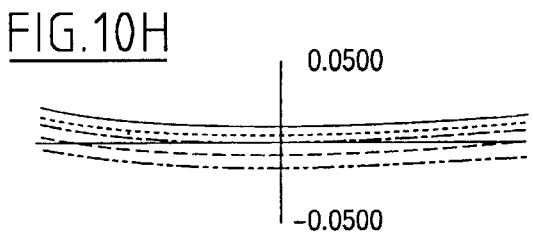
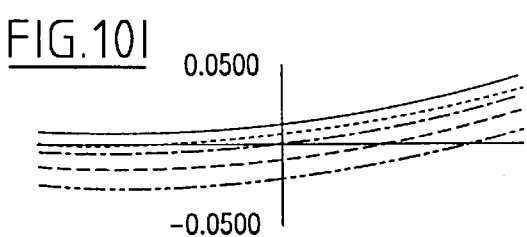
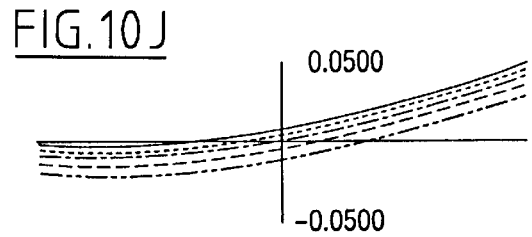
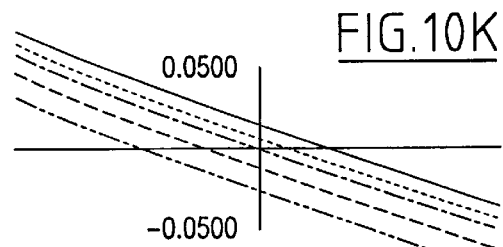
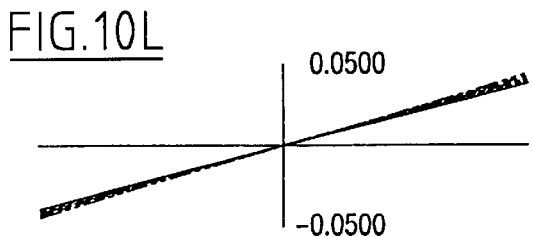
——— 656.0 NM  −−−−−− 486.0 NM
·········· 587.0 NM  −·−·−·− 435.0 NM
−··−··− 546.0 NM

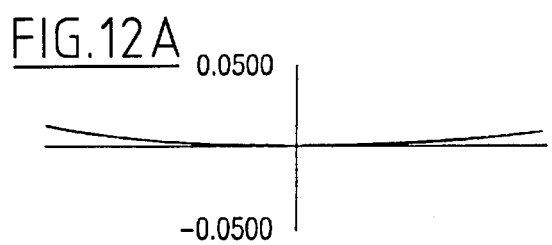
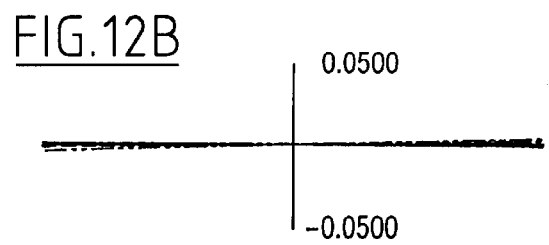
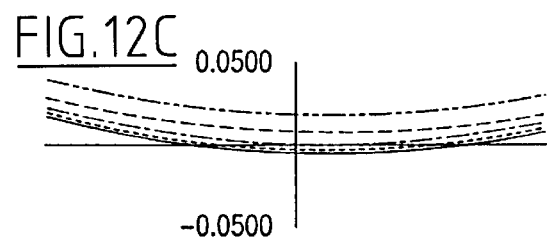
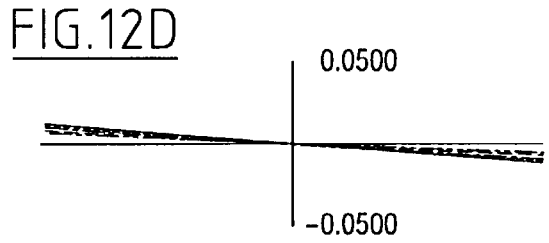
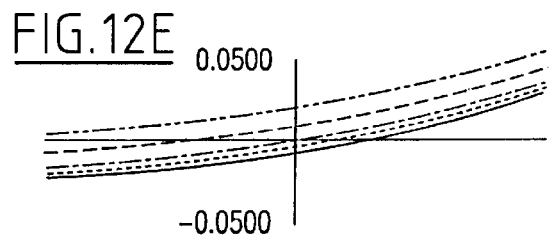
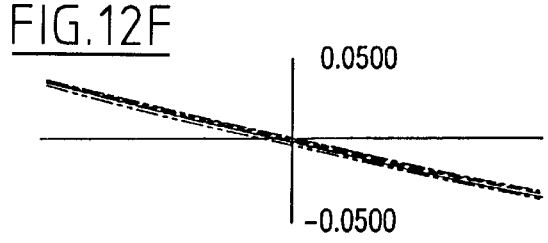
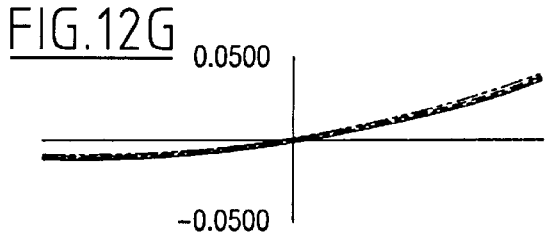
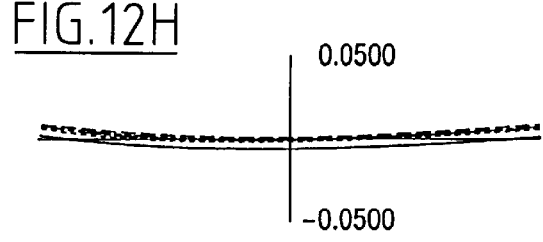
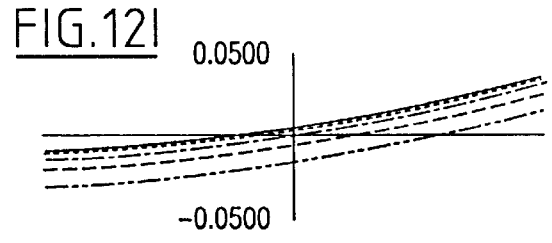
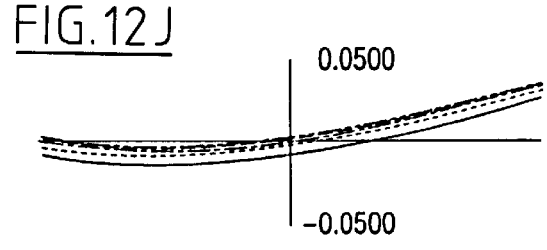
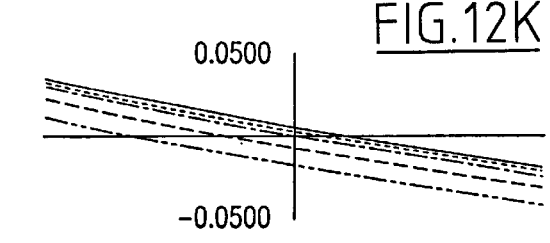
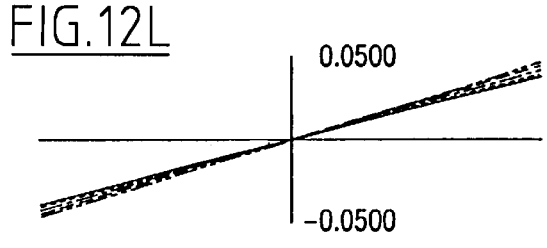
———— 656.0 NM   - - - - - 486.0 NM
·········· 587.0 NM   —·—·— 435.0 NM
—··—··— 546.0 NM

HOE

SEALING MATERIAL SUCH AS ADHESIVE

HOE

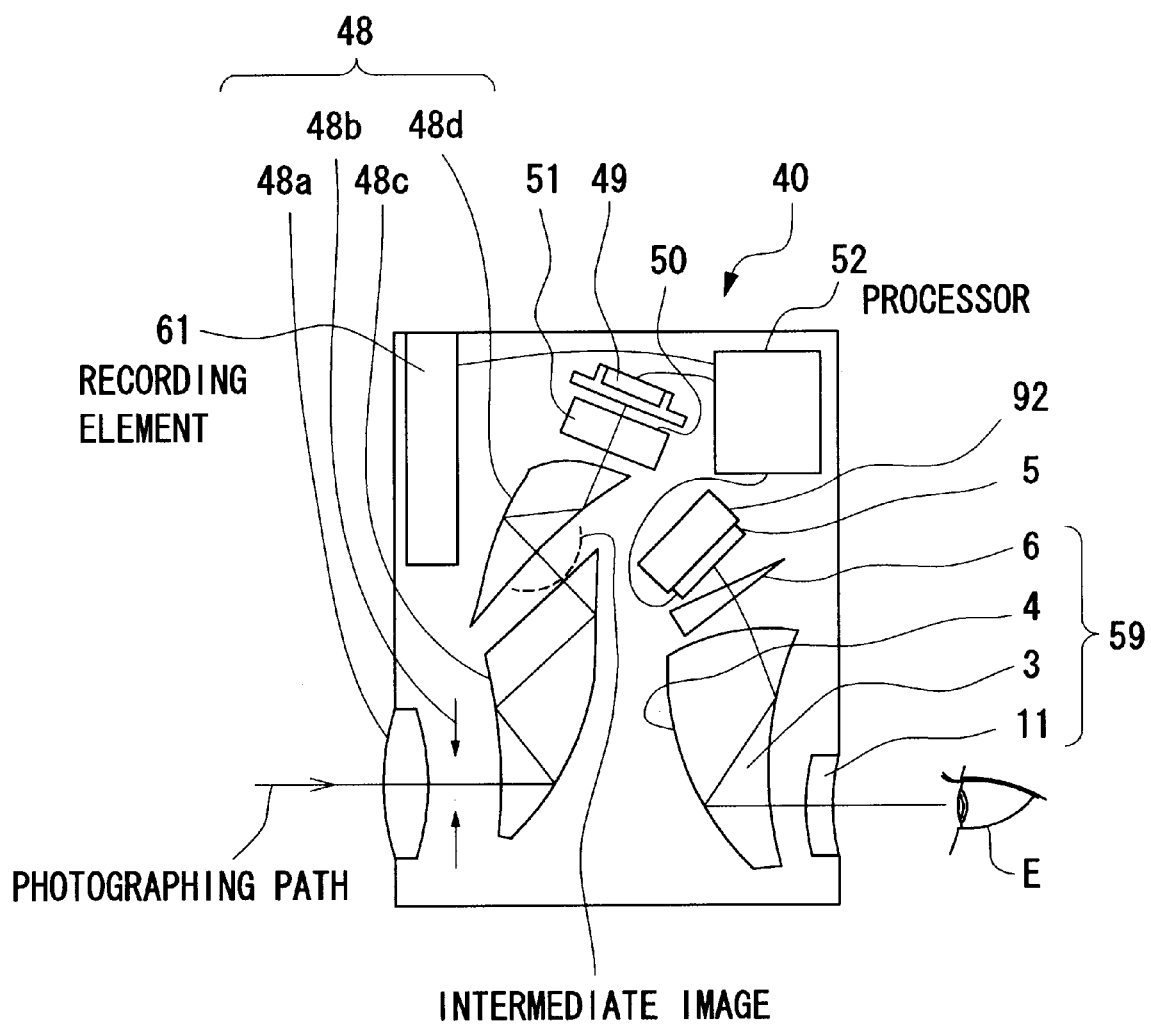

HOE

FREE CURVED SURFACE

ASYMMETRIC WITH RESPECT TO
ANY HORIZONTAL PLANE

SYMMETRIC WITH RESPECT TO
VERTICAL PLANE (EXAMPLE) WHERE MEDIUM IS AIR WITH n=1:

$$\Phi_0^{2P} = -r_2 - r_1 < 0$$

OBSERVATION OPTICAL SYSTEM USING VOLUME HOLOGRAM

BACKGROUND OF THE INVENTION

1) Field of the Invention

The present invention relates to an image observation optical system. To be specific, it relates to an image observation optical system used in an image display apparatus that can be held on the head or face of an observer and that can be attached to a cellular phone or a portable intelligent terminal.

2) Description of Related Art

In recent years, development has been energetically made for image display apparatuses, specifically for those to be held on the head or face of individuals for entertaining them with a large image. Also, in accordance with recent popularization of cellular phone and portable intelligent terminal, requirements for large view of graphics or text data on these apparatuses have grown.

As conventional image observation optical systems used in image display apparatuses, there are those as disclosed in Japanese Patent Application Preliminary Publication (KOKAI) No. Hei 7-333551 and Japanese Patent Application Preliminary Publication (KOKAI) No. Hei 8-234137. In such an optical system, a prism whose surface having reflecting action has a rotationally asymmetric shape, such as anamorphic, toric or free curved shape, is employed, to compensate image distortion, curvature of field, and astigmatism.

However, if the image display apparatus is designed to achieve high image definition and wide field angle using such a prism, chromatic aberration of magnification by the prism itself becomes large, to cause the problem of imaging performance degradation.

SUMMARY OF THE INVENTION

Therefore, an object of the present invention is to provide an image observation optical system which is made so compact as to be applicable, as an image display apparatus, to a cellular phone or a portable intelligent terminal, and which can achieve high image definition and wide field angle while controlling chromatic aberration of magnification to be small.

An image observation optical system according to the present invention comprises an image display element and an eyepiece optical system which introduces, without forming an intermediate image, an image formed by the image display element into the center position of an eye of an observer so as to allow the observer to observe the image as a virtual image. The eyepiece optical system is configured to bend the optical axis using reflecting surfaces for compact-sizing of the optical system, with the optical axis lying in a plane, with respect to which the optical system is symmetrically formed, and to have an optical element that has an entrance surface, a plurality of reflecting surfaces and an exit surface, wherein at least one of the reflecting surfaces is provided with a volume hologram (HOE).

Here, the refractive index of the optical element is preferably greater than 1.7. It is because an element that exerts the same power with higher refractive index produces smaller amount of aberrations.

Also, according to the present invention, it is preferred that a prism with a positive refracting power and a HOE are provided and that, upon an image point F0 at the midpoint, and, of image points at the end points under a condition without the HOE, an image point Fb showing the larger chromatic aberration of magnification and an image point Fa showing the smaller chromatic aberration of magnification being defined on a segment that is an intersection formed by the plane of symmetry and an image display surface, the following conditions (1) and (2) are simultaneously satisfied:

$$-1 < \phi y(HOE, Fa)/\phi y(Total) < 2 \quad (1)$$

$$-1 < \phi y(HOE, Fb)/\phi y(Total) < 1 \quad (2)$$

where $\phi y(HOE, Fa)$ is a y-direction power of the HOE at the image position Fa, $\phi y(HOE, Fb)$ is a y-direction power of the HOE at the image position Fb, and $\phi y(Total)$ is a y-direction power of the entire system.

Also, according to the present invention, it is preferred that, in a prism optical system having at least two reflecting surfaces, the HOE has one or two plane of symmetry of power, and the plane of symmetry of power coincides with a plane of symmetry of shape of a base on which the HOE is provided.

According to the present invention, an optical system whose optical axis is bent using reflecting surfaces is configured as an eyepiece optical system, to achieve compact-sizing.

A prism with a positive refracting power is used as this optical system.

As stated above, if high image definition and wide field angle is attempted using a prism, the problem of large chromatic aberration of magnification should occur. The present applicants have thought of making a chromatic aberration of magnification derived from a prism canceled by endowing a diffraction element an effect of a chromatic aberration of magnification with inverse tendency. First, the applicants examined a case where compensation of a chromatic aberration of magnification derived from a prism is made using a relief hologram (DOE) as the diffraction element.

A diffraction element is provided, as scarcely having a thickness, on a transparent base. As shown in FIG. 33, for example, its power distribution varies by position on the surface thereof. Since a chromatic aberration of magnification varies according to the variation of power of the diffraction element, if a diffraction element having a power distribution that causes a chromatic aberration of magnification having an inverse tendency to the chromatic aberration of magnification derived from the prism is provided on a predetermined surface of the prism, the chromatic aberration of magnification derived from the prism can be compensated without size increase of the optical system. Also, if the diffraction element is formed integral with the prism, disorder of alignment regarding the prism and the diffraction element does not occur.

Regarding the hologram element, there are two types; i.e. a relief hologram (DOE) and a volume hologram (HOE). The DOE has the property of low selectivity regarding incident angle and low selectivity regarding wavelength. Thus, the DOE diffracts rays with a particular wavelength incident thereon at a particular angle and images them as desired order rays, while diffracting, at a low diffraction efficiency, other rays with different wavelengths incident thereon at different angles and imaging them as undesired order rays. In contrast, the HOE has the property of high selectivity with respect to incident angle and high selectivity with respect to wavelength. Thus, the HOE exclusively diffracts rays with a particular wavelength incident thereon at a particular angle, while transmitting the remaining rays as $0^{th}$ order rays so that undesired order rays should hardly be imaged.

If mass-productivity is considered, it is efficient to fabricate the DOE by lathing. In this case, the DOE is necessarily shaped rotationally symmetric. Therefore, it cannot compensate a chromatic aberration of magnification derived from a prism having a rotationally asymmetric surface such as a free curved surface as shown in FIG. 34. Also, if the relief hologram is used, undesired order rays ($0^{th}$ order rays, $2^{nd}$ order rays) are generated, in addition to the desired order rays, to degrade the image and obstruct observation.

Then, the present applicants examined a case where compensation of a chromatic aberration of magnification derived from a prism is made using a reflection-type HOE instead of the DOE. As shown in FIG. 35A, since the HOE can be constructed to have a rotationally asymmetric power distribution, it can be configured to exert an effect to cancel a chromatic aberration of magnification derived from a prism that has a free curved surface. Also, in general, if a HOE is applied to a reflecting surface, $0^{th}$ order rays alone are generated as undesired order rays. Moreover, if the HOE is disposed on a surface that is directed opposite to the eye of the observer, as shown in FIG. 1, $0^{th}$ order rays, which are generated only by a small amount, are effused in directions deviated from the eye of the observer, and thus do not obstruct observation. In this way, if a HOE is used as the diffraction element as in the present invention, image blur by undesired order rays are precluded from generation and resultantly a clear image for observation can be obtained.

As shown in FIGS. 35A–35B, a HOE (represented by H in the drawings) is applied to an optical surface B (for example, a reflecting surface) of the prism. Here, the scope of "application" is not limited to the case where a sheet-type HOE is attached to the surface of the optical system with adhesive, but includes a case where patterns are mechanically engraved on the surface of the optical system, and a case where the refractive index on the surface are varied according to a fringe pattern.

For example, as shown in FIG. 35A, if the HOE is applied to the optical surface B, which is symmetrically shaped with respect to a vertical plane L1, in such a manner that its plane of symmetry of power coincides with L1, the power of the HOE as viewed from the side is asymmetric with respect to any horizontal plane, as shown in FIG. 35C, and the power of the HOE as viewed from the top is symmetric with respect to the vertical plane, as shown in FIG. 35D.

In contrast, in the case of a DOE fabricated by lathing, since its power is symmetric as viewed from the side and as viewed from the top, it cannot compensate a chromatic aberration of magnification derived from an optical member that has a rotationally asymmetric (i.e. asymmetric with respect to at least one of a horizontal plane and a vertical plane) surface.

For example, consideration is made for a case where, in an image observation optical system provided with a decentered prism which compensated decentered aberrations by a free curved surface component as shown in FIG. 34, a color HOE is additionally disposed on a surface thereof. Under this condition, as shown in FIG. 1, a base surface (surface B), on which the HOE is provided, of the prism 3 is modified to have a spherical shape, and the former free curved surface component of the surface B, which compensated decentered aberrations, is decomposed into polynomial XY power components of the color HOE, a free curved surface component of a surface A, and a free curved surface component of a surface C. In this way, it is made possible to maintain the decentered compensation performance of the prism as before, and, in addition, to compensate the chromatic aberration of magnification derived from surface shape of the prism by means of the power of the HOE.

If the power for compensation of the chromatic aberration of magnification derived from the prism is largely allotted to a single HOE, an even larger chromatic aberration of magnification should be generated. To solve this problem, as shown in FIG. 1, an optical element (a wedge prism) 5 constructed with two opposite surfaces that are plane surfaces non-parallel to each other is preferably arranged to cancel dispersion of bundles of rays at the HOE surface by means of the spectral effect of the wedge prism, so that the chromatic aberration of magnification is compensated by the entire optical system. However, if the power for compensation of the chromatic aberration of magnification derived from the prism is too largely allotted to a single HOE, the chromatic aberration of magnification cannot be sufficiently cancelled even by the spectral effect of the wedge prism.

Here, in reference to the drawings, the power of a HOE is explained.

Let us consider a ray from the center of the pupil to each image position (which is termed "chief ray") and calculate the power of each surface at the position of this ray.

For example, in the image observation optical system shown in FIG. 1, the optical axis lies in a plane, with respect to which the prism optical system is symmetric.

In the explanation of the present invention, the direction parallel to the plane of symmetry (i.e. parallel to the sheet of the figure) is defined as Y direction, and the direction that intersects the Y direction on the local coordinate plane of each surface at right angles is defined as X direction.

Also, since the power depends on azimuth, X-direction power and Y-direction power are calculated separately.

Also, in the explanation of the present invention, on a segment that is an intersection formed by the plane of symmetry and the image display surface, an image position at the midpoint is represented by F0, and image positions at the end points are represented by Fa, Fb. If no HOE were included, asymmetry should appear regarding the chromatic aberration of magnification at Fa and Fb by the effect of the decentered optical system. Under this condition, the image position that should show the larger chromatic aberration of magnification is defined as Fb, and the image position that should show the smaller chromatic aberration of magnification is defined as Fa.

Regarding a surface provided with a HOE, the power derived from the shape of the base surface and the power derived from the HOE are separately considered. The power contributed by the HOE alone is calculated for a chief ray at each of the image positions, to obtain φy(HOE, Fb), φy(HOE, Fa). In this case, it is preferred that the following conditions (1), (2) are simultaneously satisfied:

$$-1 < \phi y(HOE, Fa)/\phi y(Total) < 2 \qquad (1)$$

$$-1 < \phi y(HOE, Fb)/\phi y(Total) < 1 \qquad (2)$$

where φy(HOE, Fa) is a y-direction power of the HOE at the image position Fa, φy(HOE, Fb) is a y-direction power of the HOE at the image position Fb, and φy(Total) is a y-direction power of the entire system.

If the lower limit value of each of Conditions (1), (2) is not reached, compensation performance of the HOE regarding the chromatic aberration of magnification is insufficient, and resultantly the chromatic aberration of magnification is undercompensated.

If the upper limit value of each of Conditions (1), (2) is exceeded, compensation performance of the HOE regarding the chromatic aberration of magnification is too large, and resultantly the chromatic aberration of magnification is overcompensated.

In this case, it is much preferred that the following conditions (3), (4) are satisfied:

$$0 < \phi y(HOE, Fa)/\phi y(Total) < 1 \quad (3)$$

$$-0.5 < \phi y(HOE, Fb)/\phi y(Total) < 0.5 \quad (4)$$

where $\phi y(HOE, Fa)$ is a y-direction power of the HOE at the image position Fa, $\phi y(HOE, Fb)$ is a y-direction power of the HOE at the image position Fb, and $\phi y(Total)$ is a y-direction power of the entire system.

Furthermore, in this case, it is still much preferred that the following conditions (5), (6) are satisfied:

$$0.005 < \phi y(HOE, Fa)/\phi y(Total) < 0.4 \quad (5)$$

$$-0.2 < \phi y(HOE, Fb)/\phi y(Total) < 0.2 \quad (6)$$

where $\phi y(HOE, Fa)$ is a y-direction power of the HOE at the image position Fa, $\phi y(HOE, Fb)$ is a y-direction power of the HOE at the image position Fb, and $\phi y(Total)$ is a y-direction power of the entire system.

Also, it is desirable that every X-direction power of the HOE is positive in a region inside the effective diameter for rays (i.e. a power in any local region does not become negative).

Since the entire prism has a positive power, it is desirable, for compensation of chromatic aberration of magnification, that the HOE also has positive powers over the entire surface thereof.

Also, according to the present invention, it is preferred that the prism with a positive refracting power has at least one reflecting surface, and that the HOE is formed on a surface of the prism.

Also, according to the present invention, it is preferred that the prism with a positive refracting power has at least one reflecting surface, and that the HOE is configured to have a rotationally asymmetric power so as to compensate rotationally asymmetric chromatic aberration of magnification at a position between the image display element and the eye of the observer.

As the power of a HOE increases, generation of chromatic aberration of magnification tends to increase. If the chromatic aberration of magnification generated by the prism optical system is large and the power for compensating this aberration is largely allotted to a single HOE, the chromatic aberration of magnification derived from the HOE becomes large.

Therefore, according to the present invention, it is preferred that the optical system comprises a prism with a positive refracting power, uses at least two HOEs at positions between the image display element and the exit pupil, and satisfies the following condition (7):

$$|\phi y(HOE, F0)/\phi y(Total)| \leq 0.25 \quad (7)$$

where $\phi y(HOE, F0)$ is a y-direction power of the HOEs at the image position F0, and $\phi y(Total)$ is a y-direction power of an entire system.

If two HOEs are provided as in the present invention, the second HOE can be configured to generate a chromatic aberration of magnification having inverse tendency to the chromatic aberration of magnification generated by the first HOE. Accordingly, the effect of the chromatic aberration of magnification derived from the second HOE can cancel the chromatic aberration of magnification derived from the first HOE.

In this case, it is much preferred that the following condition (8) is satisfied:

$$|\phi y(HOE, F0)/\phi y(Total)| \leq 0.10 \quad (8)$$

where $\phi y(HOE, F0)$ is a y-direction power of the HOEs at the image position F0, and $\phi y(Total)$ is a y-direction power of an entire system.

Furthermore, it is still much preferred that the following condition (9) is satisfied:

$$|\phi y(HOE, F0)/\phi y(Total)| \leq 0.025 \quad (9)$$

where $\phi y(HOE, F0)$ is a y-direction power of the HOEs at the image position F0, and $\phi y(Total)$ is a y-direction power of an entire system.

Also, in order to compensate the chromatic aberration of magnification generated by the HOE, an optical member constructed with two opposite surfaces that are configured as plane surfaces non-parallel to each other, such as a wedge prism, may be incorporated in addition to the prism with a positive refracting power and the HOE. If, as stated above, any additional HOE is provided instead of the wedge prism so that the power for compensation of chromatic aberration of magnification is divided between the plurality of HOEs, space saving and weight reduction can be achieved in comparison with the configuration with the wedge prism. In this case, if all of the plurality of HOEs are applied to surfaces of the prism, further space saving can be achieved.

It is noted that, according to the present invention, the prism with a positive refracting power is a decentered prism, and has an entrance surface via which bundles of rays emergent from the image display element enter the prism, a plurality of reflecting surfaces at which the bundles of rays are reflected inside the prism, and an exit surface via which the bundles of rays exit out of the prism.

Unless at least one reflecting surface is decentered from an axial chief ray, the path of the axial chief ray incident on the reflecting surface coincides with the path of the axial chief ray reflected therefrom and thus the axial chief ray is interrupted in the observation optical system, where the axial chief ray is defined as a ray travelling from the center of the object point, via the center of the pupil through the center of the image surface, as traced in the reverse direction. As a result, a beam of rays with its central portion being interrupted is used for image formation and thus the image becomes dark at its center or image formation completely fails at the center.

Also, in the case where a reflecting surface having a power is decentered from the axial chief ray, it is desirable that at least one of surfaces included in the prism used in the present invention is shaped as a rotationally asymmetric surface. It is particularly preferred that at least one reflecting surface of the prism member is shaped as a rotationally asymmetric surface in view of compensation of aberrations. Also, the power distribution of the HOE used in the present invention is rotationally asymmetric. The base surface on which the HOE is provided may be shaped as any one of a cylindrical surface, a spherical surface, an aspherical surface, an anamorphic surface, a toric surface, a surface that defines only one plane of symmetry, and a plane-symmetric free curved surface.

Also, a rotationally asymmetric surface used in the present invention may be configured as any one of an anamorphic surface, a toric surface, and a free curved surface that defines only one plane of symmetry. Specifically, the surface is preferably configured as a free curved surface that defines only one plane of symmetry.

Also, according to the present invention, it is desirable to cover the HOE with a dust shield member.

A HOE exposed to the outside air would absorb moisture and expand to change its peak wavelength regarding diffraction efficiency, and thus is likely to affect the diffraction power. To prevent this phenomenon, the dust shield member is adopted.

The dust shield member may enclose the entire image observation optical system.

The dust shield member is preferably provided with a case which accommodates the optical system and a transparent cover via which light enters or exits out of the case. In this configuration, upon the transparent cover being made of material such as glass or plastic, a HOE may be provided, inside the dust shield member, on a surface of the transparent cover using it as the base.

This configuration can prevent dust or the like from being visible as an enlarged image, and, in addition, can protect the diffraction element from moisture outside, which could cause expansion of the diffraction element and change of the peak wavelength regarding diffraction.

In this configuration, it is preferred that a wedge-shaped optical member is used as the transparent cover also. Furthermore, it is preferred that the HOE is applied to the wedge-shaped optical member. Alternatively, the HOE may be sandwiched between two wedge-shaped optical members. In this case, the unit may be sealed with adhesive or the like at the faces of the HOE that are not sandwiched between the wedge-shaped optical members.

Also, an image display element, a main frame in which any one of the above-mentioned observation optical system of the present invention is arranged as an eyepiece optical system, and a support member which is constructed to be mounted on the lateral sides of the head of an observer so as to hold the main frame in front of the face of the observer can be combined into a head-mount type image display apparatus.

In this case, the head-mount type image display apparatus may be configured so that the observation optical system and spectacle lenses are integrally arranged in the main frame.

Alternatively, the head-mount type image display apparatus may be configured so that the support member is constructed to achieve removable mount to side frames of spectacles.

Also, a pair of the observation optical systems can be arranged in parallel as left and right systems so as to configure a head-mount type binocular image display apparatus.

This and other objects as well as features and advantages of the present invention will become apparent from the following detailed description of the preferred embodiments when taken in conjunction with the accompanying drawings.

BRIEF DESCRIPTION OF THE DRAWINGS

FIGS. 4A–4L are lateral aberration diagrams of the image observation optical system of the first embodiment.

FIGS. 6A–6L are lateral aberration diagrams of the image observation optical system of the third embodiment.

FIGS. 10A–10L are lateral aberration diagrams of the image observation optical system of the first reference example.

FIGS. 12A–12L are lateral aberration diagrams of the image observation optical system of the second reference example.

FIG. 15A shows a mode in which a HOE is applied to one surface of a wedge prism, and FIG. 15B shows a mode in which a HOE is sandwiched between two wedge prisms.

FIG. 30 is a schematic view of an electronic camera to which the image observation optical system according to the present invention is applied.

FIG. 35A is a front view and FIG. 35B is a side view.

FIG. 35C shows the power as viewed from the side and FIG. 35D shows the power as viewed from the top.

DETAILED DESCRIPTION OF THE PREFERRED EMBODIMENTS

Figure 1:
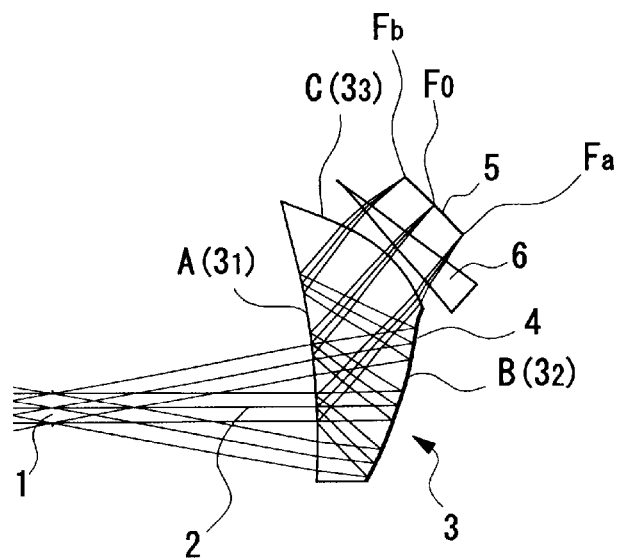
FIG. 1 is a sectional view of an image observation optical system according to the second embodiment of the present invention taken along Y-Z plane in which the optical axis lies.

Preceding the descriptions of the individual embodiments, explanation will be made of the definitions of the terms and concepts used for the present invention.

In the image observation optical system according to the present invention, the axial chief ray is defined as a ray travelling from the center of the exit pupil through the center of the image display element. The optical axis, which is defined by the straight line portion of the axial chief ray from the center of the exit pupil to the first surface of the optical system, is defined as Z axis. The axis that intersects Z axis at right angles and that lies in a plane of decentering for each surface constituting the prism member of the first unit is defined as Y axis. The axis that intersects Z axis at right angles and that intersects Y axis on the local coordinate plane of each surface at right angles is defined as X axis. The center of the exit pupil is determined as the origin of the coordinate system for the observation optical system of the present invention. Also, according to the present invention, surface arrangement numbers are assigned in order from the exit pupil through the image display element to conform to the reverse ray tracing. A direction of the axial chief ray from the exit pupil toward the image display element is defined as a positive direction of Z axis. A direction of Y axis that is toward the image display element is defined as a positive direction of Y axis. A direction of X axis that forms a right-hand system along with Y axis and Z axis is defined as a positive direction of X axis.

Here, a free curved surface used in the present invention is defined by the following equation (10) where Z axis appearing therein is the axis of the free curved surface:

$$Z = cr^2 / \{1 + \sqrt{1 - (1+k)c^2 r^2}\} + \sum_{j=2}^{66} c_j X^m Y^n \qquad (10)$$

The first term of Equation (10) expresses the spherical surface component. The second term of Equation (10) expresses the free curved surface component. In the term of the spherical surface component, c represents a curvature at the vertex, k represents a conic constant, and $r = \sqrt{X^2 + Y^2}$.

The term of the free curved surface component is expanded as shown in the following equation (11):

$$\sum_{j=2}^{66} C_j X^m Y^n = C_2 X + C_3 Y + C_4 X^2 + C_5 XY + C_6 Y^2 + C_7 X^3 + \qquad (11)$$

$$C_8 X^2 Y + C_9 XY^2 + C_{10} Y^3 + C_{11} X^4 + C_{12} X^3 Y + C_{13} X^2 Y^2 +$$

$$C_{14} XY^3 + C_{15} Y^4 + C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 + C_{25} X^3 Y^3 +$$

$$C_{26} X^2 Y^4 + C_{27} XY^5 + C_{28} Y^6 + C_{29} X^7 + C_{30} X^6 Y + C_{31} X^5 Y^2 +$$

$$C_{32} X^4 Y^3 + C_{33} X^3 Y^4 + C_{34} X^2 Y^5 + C_{35} XY^6 + C_{36} Y^7 \ldots$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane.

Such a free curved surface is obtained, for example, by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ . . . of the terms in Equation (11) at zero.

Alternatively, upon all terms with odd-numbered powers of Y being nullified, the free curved surface can define only one plane of symmetry that is parallel to X-Z plane. Such a free curved surface is obtained, for example, by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ . . . of the terms in Equation (11) at zero.

Also, a free curved surface that defines one of the above-mentioned planes of symmetry is arranged so that its plane of symmetry corresponds to the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate rotationally asymmetric aberrations caused by decentering and to improve facility for fabrication.

Equation (10) is presented as one example that can define a free curved surface. Even if the free curved surface of the present invention is defined by any different expression other than Equation (10), it still has a similar effect, as a matter of course.

According to the present invention, a reflecting surface included in the prism can be shaped as a plane-symmetric free curved surface defining only one plane of symmetry.

Configuration of an anamorphic surface is defined by the following equation (12). The normal to the optical surface at the origin of the surface shape is defined as the axis of the anamorphic surface.

$$Z = (C_x \cdot X^2 + C_y \cdot Y^2) / \\ \left[1 + \{1 - (1+K_x)C_x^2 \cdot X^2 - (1+K_y)C_y^2 \cdot Y^2\}^{1/2}\right] + \\ \sum R_n \{(1-P_n)X^2 + (1+P_n)Y^2\}^{(n+1)} \quad (12)$$

Here, if it is assumed that n is from 1 to 4 (polynomial of degree 4), for example, Equation (12) is expanded as the following expression (13):

$$Z = (C_x \cdot X^2 + C_y \cdot Y^2) / \\ \left[1 + \{1 - (1+K_x)C_x^2 \cdot X^2 - (1+K_y)C_y^2 \cdot Y^2\}^{1/2}\right] + \\ R_1\{(1-P_1)X^2 + (1+P_1)Y^2\}^2 + \\ R_2\{(1-P_2)X^2 + (1+P_2)Y^2\}^3 + \\ R_3\{(1-P_3)X^2 + (1+P_3)Y^2\}^4 + R_4\{(1-P_4)X^2 + (1+P_4)Y^2\}^5 \quad (13)$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Regarding the toric surface, there are two kinds; i.e. X toric surface and Y toric surface, which are expressed by the following equations (14), (15), respectively. The normal to the optical surface at the origin of the surface shape is defined as the axis of the toric surface.

X toric surface is defined as follows:

$$F(X) = C_x \cdot X^2 / \left[1 + \{1 - (1+K)C_x^2 \cdot X^2\}^{1/2}\right] + \\ AX^4 + BX^6 + CX^8 + DX^{10} \ldots \quad (14)$$

$$Z = F(X) + (1/2)C_y\{Y^2 + Z^2 - F(X)^2\}$$

Y toric surface is defined as follows:

$$F(Y) = C_y \cdot Y^2 / \left[1 + \{1 - (1+K)C_y^2 \cdot Y^2\}^{1/2}\right] + \\ AY^4 + BY^6 + CY^8 + DY^{10} \ldots \quad (15)$$

$$Z = F(Y) + (1/2)C_x\{X^2 + Z^2 - F(Y)^2\}$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x=1/C_x, R_y=1/C_y.$$

Figure 36:
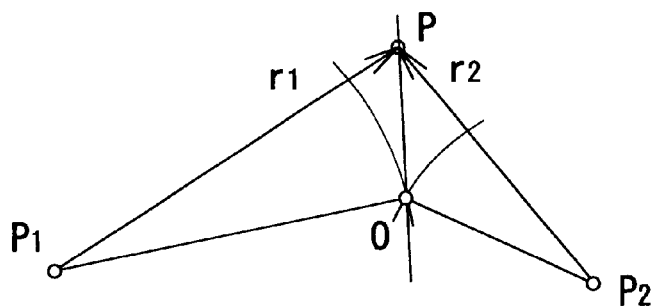
FIG. 36 is a view to show the principle of defining a HOE according to the present invention.

The diffraction element (HOE) used in the present invention is defined as follows. FIG. 36 is a view to show the principle of defining HOE according to the present invention.

Ray tracing for a ray with wavelength $\lambda$ incident at and emergent from any point P on the HOE surface is given by the following equation (16), which uses the optical path difference function $\Phi_0$ defined for a reference wavelength $\lambda_0$=HWL on the HOE surface:

$$n_d Q_d \cdot N = n_i Q_i \cdot N + m(\lambda/\lambda_0) \nabla \Phi_0 \cdot N \quad (16)$$

where N is a vector of the normal to the HOE surface, $n_i$ ($n_d$) is a refractive index on the incident side (emergent side), $Q_i$ ($Q_d$) is a vector (unit vector) of incidence (emergence), and m=HOR is a diffraction order of emergent light.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$=(HX2, HY2, HZ2) as shown in FIG. 36, the following equation is satisfied:

$$\Phi_0 = \Phi_0^{2p}$$
$$= n_2 \cdot s_2 \cdot r_2 - n_1 \cdot s_1 \cdot r_1$$

where $r_1$ ($r_2$) is a distance (>0) from the point $P_1$ ($P_2$) to a predetermined coordinate point (i.e. the origin) O on the HOE, $n_1$ ($n_2$) is a refractive index of the point $P_1$ ($P_2$)-side medium by which the HOE was arranged during fabrication (definition), $s_1$=HV1, and $S_2$=HV2 are signs to take into consideration the travelling direction of light. In the case where the light source is a divergent light source (real point light source), the sign is set to be REA=+1, while in the case where the light source is a convergent light source (virtual point light source), the sign is set to be VIR=−1. It is noted that in defining a HOE in lens data, the refractive index $n_1$ ($n_2$) of the medium in which the HOE was arranged during fabrication is the refractive index of the medium that is adjacent to the HOE on the side of the point $P_1(P_2)$.

In general cases, reference rays and object rays used to fabricate a HOE are not limited to spherical waves. In these cases, the optical path difference function $\Phi_0$ of HOE can be defined by the following equation (17) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \quad (17)$$

The polynomial $\Phi_0^{Poly}$ is given by:

$$\Phi_0^{Poly} = \sum_j H_j \cdot x^m \cdot y^n$$
$$= H_1 x + H_2 y + H_3 x^2 + H_4 xy + H_5 y^2 + \\ H_6 x^3 + H_7 x^2 y + H_8 xy^2 + H_9 y^3 + \ldots$$

and can be defined, in general, by:

$$j=\{(m+n)^2+m+3n\}/2$$

where $H_j$ is the coefficient of each term.

Furthermore, for convenience in optical designing, the optical path difference function $\Phi_0$ may be expressed only by the additional term as follows:

$$\Phi_0=\Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

The above descriptions regarding HOE are made in reference to a local coordinate system determined by the HOE origin.

An example of the parameter set to define the HOE is shown below:

| Surface Arrangement No. | Radius of Curvature | Separation |
|---|---|---|
| object surface | ∞ | ∞ |
| stop | ∞ | 100 |
| 2 | 150 | −75 |

Figure 37:
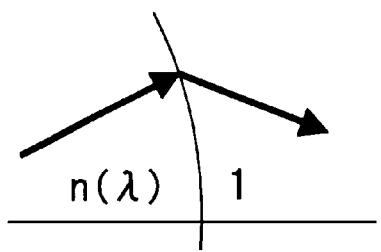
FIG. 37 is an explanatory view to explain the local power of a HOE according to the present invention.

HOE:
HV1 ($s_1$)=REA (+1)
HV2 ($S_2$)=VIR (−1)
HOR (m)=1
HX1=0, HY1=−3.40×10$^9$, HZ1=−3.40×10$^9$
HX2=0, HY2=2.50×10, HZ2=−7.04×10
HWL ($\lambda_0$)=544
$H_1$=−1.39×10$^{-21}$ $H_2$=−8.57×10$^{-5}$ $H_3$=−1.50×10$^{-4}$ Now, descriptions will be made of the local power of a HOE surface. FIG. 37 is an explanatory view to explain the local power of the HOE according to the present invention.

A HOE can be expressed as a lens with super-high refractive index of n→∞ (Sweatt Model). If the HOE defined by the optical path difference function $\Phi_0$ for the wavelength $\lambda_0$ is expressed as a lens with super-high refractive index, its SAG S(x, y) on the interface with air (n=1) is given by:

$$S(x, y)\cdot(n(\lambda)-1)=m(\lambda/\lambda_0)\Phi_0$$

In general, the local curvature $C_x$ (curvature on the plane containing the normal to the surface and x axis) of a surface, whose SAG is given by S(x, y), is given by:

$$C_x=(\partial^2 S/\partial x^2)/[\{1+(\partial S/\partial x)^2+(\partial S/\partial y)^2\}^{1/2}\cdot\{1+(\partial S/\partial x)^2\}]$$

and the power (x-component refractive power) in this condition can be given by:

$$1/f_x=-(n(\lambda)-1)\cdot C_x$$

Therefore, if n→∞, the x-component power of the HOE is obtained as:

$$\Phi_x=1/f_x=-m(\lambda/\lambda_0)(\partial^2\Phi_0/\partial x^2)$$

In the similar manner, the y-component power of the HOE is obtained as:

$$\phi_x=1/f_y=-m(\lambda/\lambda_0)(\partial^2\Phi_0/\partial y^2)$$

Next, the method to obtain the focal length of the entire system will be explained.

Where a ray travelling parallel to the optical axis at the height of 0.01 mm therefrom in X direction is made to enter the entire optical system from the object side and the angle in X direction on the image surface side formed by this ray as emergent from the optical system and the axial chief ray is defined as the numerical aperture $NA_{ix}$, the focal length FX=1/$\phi_x$ in X direction is given by FX=0.01/$NA_{ix}$. Where a ray travelling parallel to the optical axis at the height of 0.01 mm therefrom in Y direction is made to enter the entire optical system from the object side and the angle in Y direction on the image surface side formed by this ray as emergent from the optical system and the axial chief ray is defined as the numerical aperture $NA_{iy}$, the focal length FY=1/$\phi_y$ in Y direction is given by FY=0.01/$NA_{iy}$.

In each embodiment, as described above and shown in FIG. 1 for example, the axial chief ray 2 is defined as a ray travelling from the center of an exit pupil 1 (the rotation center of an eyeball of an observer) to the center of a LCD 5, which is provided as an image display element, via an optical member such as a prism 3. The optical axis, which is defined by the straight line portion of the axial chief ray 2 from the exit pupil 1 to the intersection with the entrance surface of the prism 3, which is the first optical member, is defined as Z axis. The axis that intersects Z axis at right angles and that lies in a plane of decentering for each surface constituting the prism 3 is defined as Y axis. The axis that intersects the optical axis and Y axis at right angles is defined as X axis. The center of the exit pupil 1 is determined as the origin of this coordinate system. The direction of the axial chief ray 2 from the exit pupil 1 toward the LCD 5 is defined as a positive direction of Z axis. A direction of Y axis that is toward the LCD 5 is defined as a positive direction of Y axis. A direction of X axis that forms a right-hand system along with Y axis and Z axis is defined as a positive direction of X axis.

In each embodiment of the present invention, the prism 3 is decentered in Y-Z plane in this coordinate system. Also, each rotationally asymmetric surface provided for the prism 3 has the only plane of symmetry on Y-Z plane.

For each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma$ (°)) of the center axis (=Z axis in Equation (10) for a free curved surface) of the surface in reference to X axis, Y axis and Z axis, respectively, are given. A positive value of $\alpha$ or $\beta$ means counterclockwise rotation in reference to the positive direction of the corresponding axis, while a positive value of $\gamma$ means clockwise rotation in reference to the positive direction of Z axis. Other parameters such as radius of curvature of spherical surface, surface separation, refractive index of medium, and Abbe's number are given by the conventional method.

As discussed above, the configuration of the free curved surface used in the present invention is defined by Equation (10), where Z axis corresponds to the axis of the free curved surface.

The free curved surface can be defined by Zernike polynomial, also. The configuration of the surface is defined by the following equations (18). Z axis appearing in Equation (18) represents the axis of Zernike polynomial. The rotationally asymmetric surface is defined by height in Z axis, in terms of polar coordinate, in reference to X-Y plane.

$$X = R \times \cos(A) \quad (18)$$

$$Y = R \times \sin(A)$$

$$\begin{aligned}Z = &\ D_2 + D_3 R\cos(A) + D_4 R\sin(A) + D_5 R^2 \cos(2A) + \\ & D_6(R^2 - 1) + D_7 R^2 \sin(2A) + D_8 R^3 \cos(3A) + \\ & D_9(3R^3 - 2R)\cos(A) + D_{10}(3R^3 - 2R)\sin(A) + \\ & D_{11} R^3 \sin(3A) + D_{12} R^4 \cos(4A) + \\ & D_{13}(4R^4 - 3R^2)\cos(2A) + D_{14}(6R^4 - 6R^2 + 1) + \\ & D_{15}(4R^4 - 3R^2)\sin(2A) + D_{16} R^4 \sin(4A) + \\ & D_{17} R^5 \cos(5A) + D_{18}(5R^5 - 4R^3)\cos(3A) + \\ & D_{19}(10R^5 - 12R^3 + 3R)\cos(A) + \\ & D_{20}(10R^5 - 12R^3 + 3R)\sin(A) + \\ & D_{21}(5R^5 - 4R^3)\sin(3A) + D_{22} R^5 \sin(5A) + \\ & D_{23} R^6 \cos(6A) + D_{24}(6R^6 - 5R^4)\cos(4A) + \\ & D_{25}(15R^6 - 20R^4 + 6R^2)\cos(2A) + \\ & D_{26}(20R^6 - 30R^4 + 12R^2 - 1) + \\ & D_{27}(15R^6 - 20R^4 + 6R^2)\sin(2A) + \\ & D_{28}(6R^6 - 5R^4)\sin(4A) + D_{29} R^6 \sin(6A)\ldots\end{aligned}$$

where R is a distance from Z axis in X-Y plane, A is an azimuth about Z axis expressed by a rotation angle from Y axis, and $D_m$ (m is integer equal to or greater than 2) is a coefficient. It is noted that Equation (18) corresponds to a free curved surface that is symmetric in X direction.

Configuration of a rotationally asymmetric free curved surface can be defined by the following equation (19) also. Z axis in Equation (19) corresponds to the axis of the rotationally asymmetric surface.

$$Z = \Sigma_n \Sigma_m C_{nm} X^m Y^{n-m} \quad (19)$$

where $\Sigma_n$ is the sum where n is from 0 to k, and $\Sigma_m$ is the sum where m is from 0 to n.

For defining a plane-symmetric free curved surface (a rotationally asymmetric surface having only one plane of symmetry), Equation (19), which expresses a rotationally asymmetric surface, may be used upon all its terms with odd-numbered powers of X being nullified (by, for example, coefficients of the terms with odd-numbered powers of X set to zero) in the case where symmetry of the surface appears along X direction, or upon all its terms with odd-numbered powers of Y being nullified (by, for example, coefficients of the terms with odd-numbered powers of Y set to zero) in the case where symmetry of the surface appears along Y direction.

Configuration of a rotationally symmetric aspherical surface is defined by the following equation (20). Z axis appearing in Equation (20) represents the axis of the rotationally symmetric aspherical surface.

$$Z = (Y^2/R)/[1+\{1-P(Y^2/R^2)\}^{1/2}] + A_4 Y^4 + A_6 Y^6 + A_8 Y^8 + A_{10} Y^{10} \quad (20)$$

where Y is a direction perpendicular to Z, R is a radius of paraxial curvature, P is a conical coefficient, and $A_4$, $A_6$, $A_8$, $A_{10}$ are aspherical coefficients.

In each embodiment of the present invention, configuration of a free curved surface is expressed by means of Equation (10). However, even if Equation (18) or Equation (19) is applied, it does not affect the function and effect of the invention, as a matter of course.

FIGS. 3, 1, 5, 7 are sectional views, as taken along Y-Z plane in which the optical axis lies, of the image observation optical systems according to the first to fourth embodiments of the present invention, respectively. FIGS. 4A–4L, 2A–2L, 6A–6L, 8A–8L are lateral aberrations diagrams of the image observation optical systems according to the first to fourth embodiments, respectively. The image observation optical system according to each embodiment includes a LCD 5 as the image display element, and an eyepiece optical system which introduces the image formed by the LCD 5, without forming an intermediate image, to the center of the eye of the observer, or forms the exit pupil 1 thereat, so as to allow the observer to observe the image as a virtual image. The eyepiece optical system includes a prism 3 having a positive refracting power. In the description of each embodiment, surface arrangement numbers in the optical system are assigned, in principle, in order from the exit pupil 1 through the LCD 5 (reverse ray tracing). Description of arrangement order of the surfaces in the prism 3 also conforms to the reverse ray tracing.

Of the diagrams showing lateral aberrations of the image observation optical systems of the respective embodiments, each of FIGS. 4A, 2A, 6A, 8A shows lateral aberration in Y direction of a chief ray that traverses a point where field angle in X direction is zero and field angle in Y direction is zero; each of FIGS. 4B, 2B, 6B, 8B shows lateral aberration in X direction of the chief ray that traverses the point where field angle in X direction is zero and field angle in Y direction is zero; each of FIGS. 4C, 2C, 6C, 8C shows lateral aberration in Y direction of a chief ray that traverses a point where field angle in X direction is zero and field angle in Y negative direction is maximum; each of FIGS. 4D, 2D, 6D, 8D shows lateral aberration in X direction of the chief ray that traverses the point where field angle in X direction is zero and field angle in Y negative direction is maximum; each of FIGS. 4E, 2E, 6E, 8E shows lateral aberration in Y direction of a chief ray that traverses a point where field angle in X positive direction is maximum and field angle in Y negative direction is maximum; each of FIGS. 4F, 2F, 6F, 8F shows lateral aberration in X direction of the chief ray that traverses the point where field angle in X positive direction is maximum and field angle in Y negative direction is maximum; each of FIGS. 4G, 2G, 6G, 8G shows lateral aberration in Y direction of a chief ray that traverses a point where field angle in X positive direction is maximum and field angle in Y direction is zero; each of FIGS. 4H, 2H, 6H, 8H shows lateral aberration in X direction of the chief ray that traverses the point where field angle in X positive direction is maximum and field angle in Y direction is zero; each of FIGS. 4I, 2I, 6I, 8I shows lateral aberration in Y direction of a chief ray that traverses a point where field angle in X positive direction is maximum and field angle in Y positive direction is maximum; each of FIGS. 4J, 2J, 6J, 8J shows lateral aberration in X direction of the chief ray that traverses the point where field angle in X positive direction is maximum and field angle in Y positive direction is maximum; each of FIGS. 4K, 2K, 6K, 8K shows lateral aberration in Y direction of a chief ray that traverses a point where field angle in X direction is zero and field angle in Y positive direction is maximum; and each of FIGS. 4L, 2L, 6L, 8L shows lateral aberration in X direction of the chief ray that traverses the point where field angle in X direction is zero and field angle in Y positive direction is maximum.

Also, in the image observation optical system of each embodiment, the HOE is constructed of three layers for R, G, B, so that a color image can be observed.

First Embodiment

Figure 3:
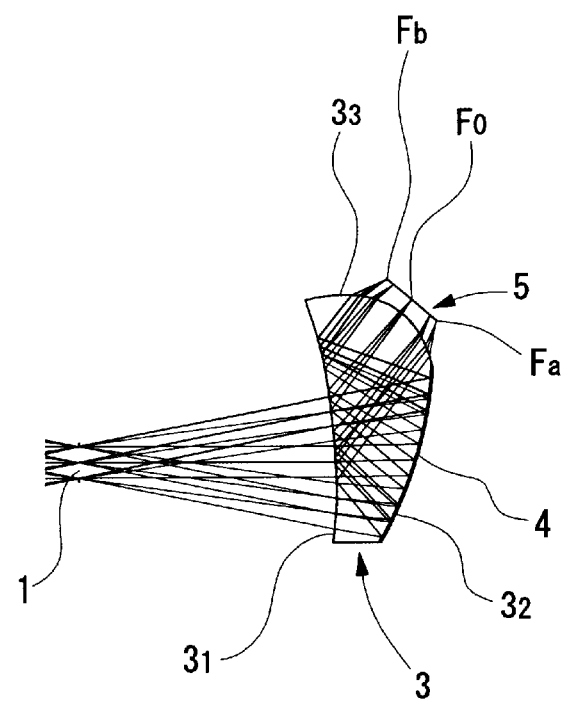
FIG. 3 is a sectional view of an image observation optical system according to the first embodiment of the present invention taken along Y-Z plane in which the optical axis lies.
Figure 2A:
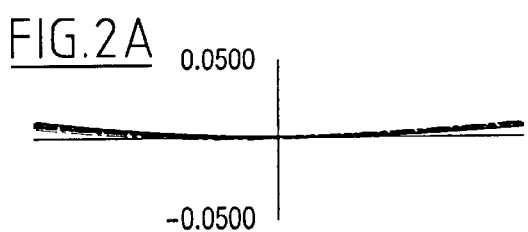
FIGS. 2A–2L are lateral aberration diagrams of the image observation optical system of the second embodiment.
Figure 2B:
Figure 2C:
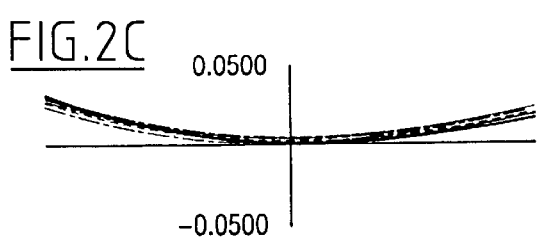
Figure 2D:
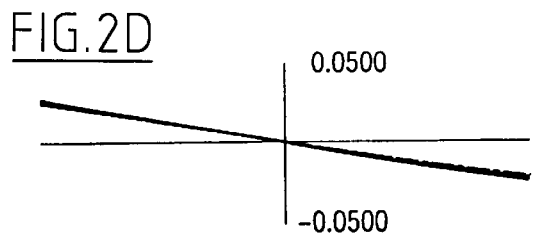
Figure 2E:
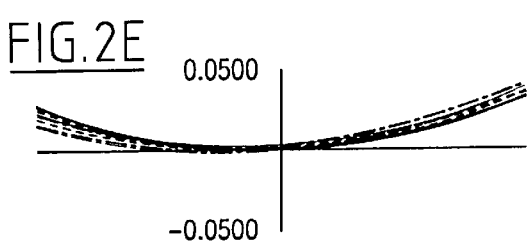
Figure 2F:
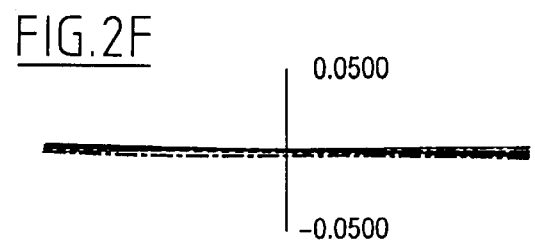
Figure 2G:
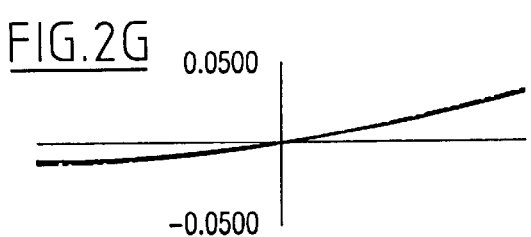
Figure 2H:
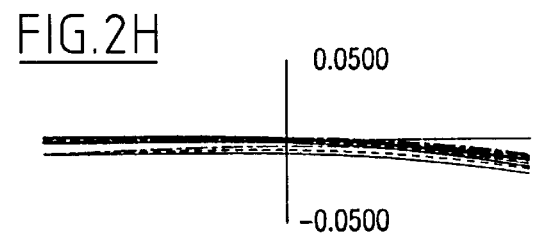
Figure 2I:
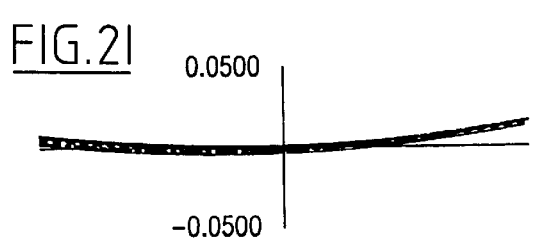
Figure 2J:
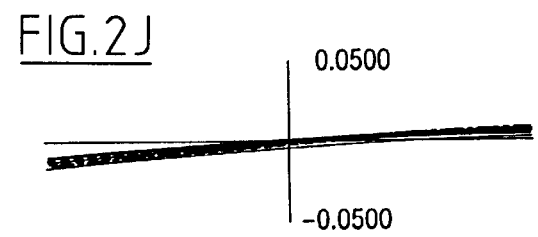
Figure 2K:
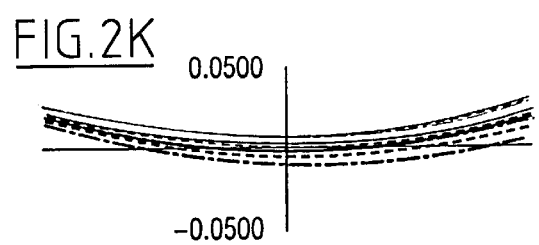
Figure 2L:
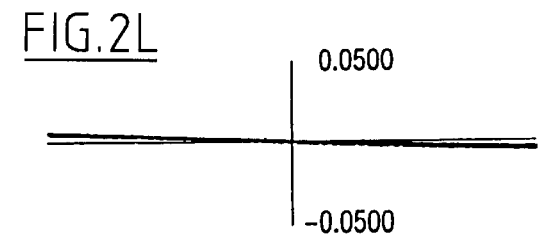
Figure 4A:
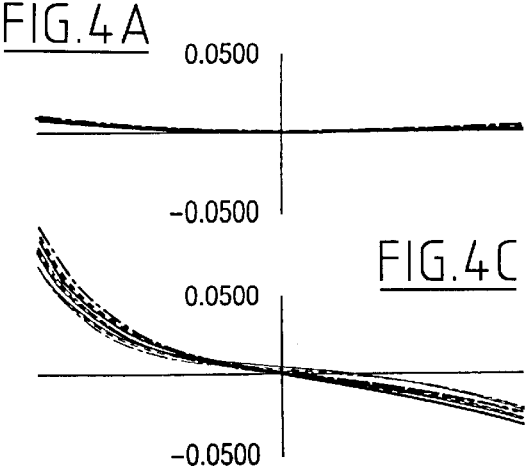
Figure 4B:
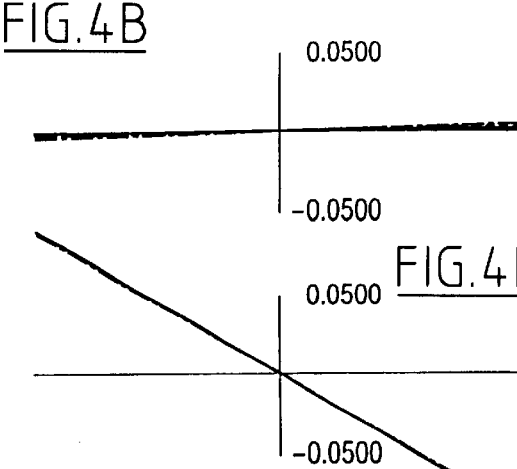
Figure 4C:
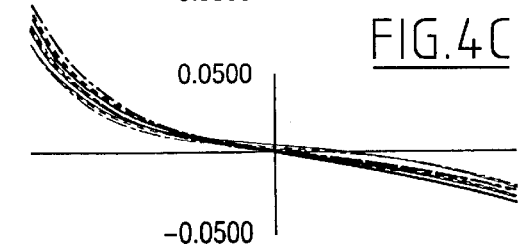
Figure 4E:
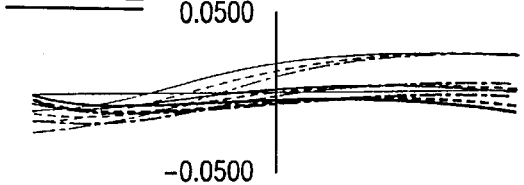
Figure 4F:
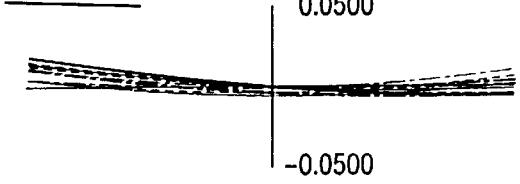
Figure 4G:
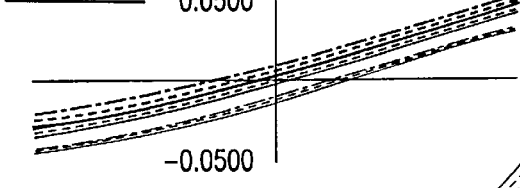
Figure 4H:
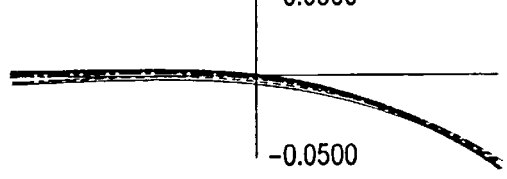
Figure 4I:
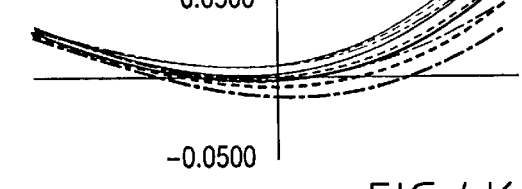
Figure 4J:
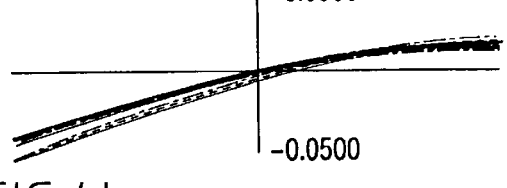
Figure 4K:
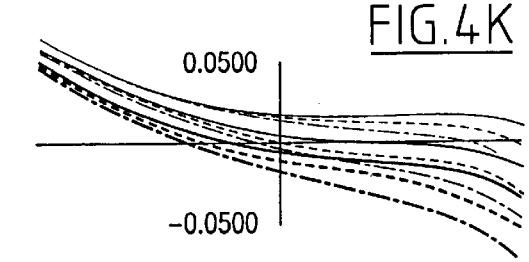
Figure 4L:
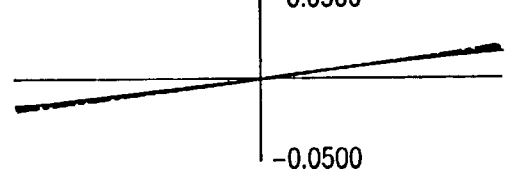

As shown in FIG. 3, in the image observation optical system of the first embodiment, the eyepiece optical system includes a prism 3 having a positive refracting power and a reflection-type HOE 4.

The prism 3 is provided with a first surface $3_1$ through a third surface $3_3$. Each of the first surface $3_1$ and the third surface $3_3$ is shaped as a rotationally asymmetric free curved surface, and the second surface $3_2$ is shaped as a spherical surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

The HOE 4 is applied to the second surface $3_2$ of the prism 3.

According to the present embodiment, after entering the prism 3 via the third surface $3_3$ thereof and being reflected at the first surface $3_1$, light from the LCD 5 is reflected by diffraction at the HOE 4 applied to the second surface $3_2$, exits out of the prism via the first surface $3_1$ thereof, and then is imaged, without being imaged intermediately, on the retina of the eye of the observer not shown, which is positioned at the exit pupil 1.

According to the present embodiment, a 0.55-inch type LCD is employed. Regarding the view field angle, horizontal field angle is 30° and vertical field angle is 22.8°, with pupil diameter of 4.0 mm. Also, observation wavelength range is ±20 nm in reference to each of B: 470 nm, G: 520 nm, R: 630 nm.

The numerical data of the first embodiment is shown below. In the data, "FFS" indicates free curved surface. In each of the following embodiments also, FFS indicates free curved surface.

Numerical Data 1

Half field angle: 15.0° in X direction, 11.4° in Y direction
Entrance pupil diameter: φ4

| Surface Arrange. Number | Radius of Curvature | Surface Separation | Decentering | Refractive Index | Abbe's Number | |
|---|---|---|---|---|---|---|
| object surface | ∞ | −1000.00 | | | | |
| 1 | stop surface | | 0.00 decentering (1) | | | |
| 2 | FFS ① | | 0.00 decentering (2) | 1.5163 | 64.1 | |
| 3 | −49.22 | | 0.00 decentering (3) | | | |
| 4 | −49.22 | reflecting surface | 0.00 decentering (3) | | | HOE surface (1) |
| 5 | −49.22 | | 0.00 decentering (3) | 1.5163 | 64.1 | |
| 6 | FFS ① | reflecting surface | 0.00 decentering (2) | 1.5163 | 64.1 | |
| 7 | FFS ② | | 0.00 decentering (4) | | | |
| image surface | ∞ | | 0.00 decentering (5) | | | |

FFS ①:

$C_4 = -4.9543 \times 10^{-3}$  $C_6 = -5.4926 \times 10^{-3}$  $C_8 = 5.4405 \times 10^{-5}$
$C_{10} = 1.7452 \times 10^{-4}$  $C_{11} = -6.2412 \times 10^{-6}$  $C_{13} = -1.2786 \times 10^{-5}$
$C_{15} = -1.0849 \times 10^{-5}$

FFS ②:

$C_4 = -3.3299 \times 10^{-2}$  $C_6 = -5.1135 \times 10^{-2}$  $C_8 = 2.2467 \times 10^{-4}$
$C_{11} = 2.7366 \times 10^{-5}$  $C_{13} = 1.7180 \times 10^{-4}$  $C_{15} = -3.8530 \times 10^{-5}$ Decentering (1):

X = 0.00  Y = 0.00  Z = 0.00
α = 0.00  β = 0.00  γ = 0.00

Decentering (2):

X = 0.00  Y = 0.00  Z = 33.00
α = 3.00  β = 0.00  γ = 0.00

Decentering (3):

X = 0.00  Y = 0.00  Z = 43.14
α = −17.50  β = 0.00  γ = 0.00

Decentering (4):

X = 0.00  Y = 19.16  Z = 41.50
α = 51.81  β = 0.00  γ = 0.00

Decentering (5):

X = 0.00  Y = 20.81  Z = 42.90
α = 49.67  β = 0.00  γ = 0.00

HOE surface (1):

HV1 = REA  HV2 = REA  HOR = 1
HX1 = 0.0  HY1 = 0.0  HZ1 = 0.0
HX2 = 0.0  HY2 = 0.0  HZ2 = 0.0
HWL (1$^{st}$ layer) = 630  HWL (2$^{nd}$ layer) = 520  HWL (3$^{rd}$ layer) = 470
$H_2 = 7.9895 \times 10^{-4}$  $H_3 = -2.7217 \times 10^{-4}$  $H_5 = 1.4189 \times 10^{-4}$
$H_7 = -2.7388 \times 10^{-5}$  $H_9 = -2.7535 \times 10^{-5}$  $H_{10} = -3.0718 \times 10^{-7}$ -continued $H_{12} = -6.2875 \times 10^{-7}$   $H_{14} = -7.4767 \times 10^{-6}$   $H_{16} = 6.8373 \times 10^{-8}$
$H_{18} = 1.7870 \times 10^{-7}$   $H_{20} = 3.1375 \times 10^{-7}$   $H_{21} = -8.1294 \times 10^{-10}$
$H_{23} = 3.8647 \times 10^{-9}$   $H_{25} = -8.0227 \times 10^{-9}$   $H_{27} = 3.6816 \times 10^{-8}$ Power of entire system:  X direction  Y direction
                                        0.048       0.046

Conditions:

Condition (1), (3), (5)     0.062818
Condition (2), (4), (6)    −0.06343
Condition (7), (8), (9)    −0.00545
Sign of X-direction power of HOE: positive

Second Embodiment

As shown in FIG. 1, in the image observation optical system of the second embodiment, the eyepiece optical system includes a prism 3 having a positive refracting power, a reflection-type HOE 4, and a wedge prism 6.

The prism 3 is provided with a first surface $3_1$ through a third surface $3_3$. Each of the first surface $3_1$ and the third surface $3_3$ is shaped as a rotationally asymmetric free curved surface, and the second surface $3_2$ is shaped as a spherical surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

The HOE 4 is applied to the second surface $3_2$ of the prism 3.

The wedge prism 6 has two opposite surfaces that are formed as plane surfaces non-parallel to each other and is disposed between the LCD 5 and the third surface $3_3$ of the prism 3.

According to the present embodiment, after being refracted via the wedge prism 6, entering the prism 3 via the third surface $3_3$ thereof and being reflected at the first surface $3_1$, light from the LCD 5 is reflected by diffraction at the HOE 4 applied to the second surface $3_2$, exits out of the prism via the first surface $3_1$ thereof, and then is imaged, without being imaged intermediately, on the retina of the eye of the observer not shown, which is positioned at the exit pupil 1.

According to the present embodiment, a 0.7-inch type LCD is employed. Regarding the view field angle, horizontal field angle is 28° and vertical field angle is 21.2°, with pupil diameter of 4.0 mm. Also, observation wavelength range is ±20 nm in reference to each of B: 470 nm, G: 520 nm, R: 630 nm.

The numerical data of the second embodiment is shown below.

Numerical Data 2

Half field angle: 14.0° in X direction, 10.6° in Y direction
Entrance pupil diameter: φ4

| Surface Arrange. Number | Radius of Curvature | Surface Separation | Decentering | Refractive Index | Abbe's Number | |
|---|---|---|---|---|---|---|
| object surface | ∞ | −1000.00 | | | | |
| 1 | stop surface | | 0.00 | decentering (1) | | |
| 2 | FFS ① | | 0.00 | decentering (2) | 1.5163 | 64.1 |
| 3 | −61.24 | | 0.00 | decentering (3) | | |
| 4 | −61.24 | reflecting surface | 0.00 | decentering (3) | | HOE surface (1) |
| 5 | −61.24 | | 0.00 | decentering (3) | 1.5163 | 64.1 |
| 6 | FFS ① | reflecting surface | 0.00 | decentering (2) | 1.5163 | 64.1 |
| 7 | FFS ② | | 0.00 | decentering (4) | | |
| 8 | ∞ | | 0.00 | decentering (5) | 1.5163 | 64.1 |
| 9 | ∞ | | 0.00 | decentering (6) | | |
| image surface | ∞ | | 0.00 | decentering (7) | | |

FFS ①:

$C_4 = -4.1902 \times 10^{-3}$   $C_6 = -4.2904 \times 10^{-3}$   $C_8 = -3.3364 \times 10^{-5}$
$C_{10} = -2.2208 \times 10^{-5}$   $C_{11} = -7.8524 \times 10^{-7}$   $C_{13} = 1.9353 \times 10^{-6}$
$C_{15} = -5.4505 \times 10^{-7}$

FFS ②:

$C_4 = -6.5417 \times 10^{-3}$   $C_6 = -2.9521 \times 10^{-2}$   $C_8 = 4.9017 \times 10^{-4}$
$C_{11} = -1.3286 \times 10^{-5}$   $C_{13} = 8.5736 \times 10^{-5}$   $C_{15} = 4.0290 \times 10^{-5}$ Decentering (1):

X = 0.00   Y = 0.00   Z = 0.00
α = 0.00   β = 0.00   γ = 0.00

Decentering (2):

X = 0.00   Y = 0.00   Z = 34.00
α = 2.09   β = 0.00   γ = 0.00

-continued

Decentering (3):

| | | |
|---|---|---|
| X = 0.00 | Y = 0.00 | Z = 44.37 |
| α = −18.02 | β = 0.00 | γ = 0.00 |

Decentering (4):

| | | |
|---|---|---|
| X = 0.00 | Y = 19.80 | Z = 43.21 |
| α = 45.85 | β = 0.00 | γ = 0.00 |

Decentering (5):

| | | |
|---|---|---|
| X = 0.00 | Y = 20.97 | Z = 44.15 |
| α = 40.40 | β = 0.00 | γ = 0.00 |

Decentering (6):

| | | |
|---|---|---|
| X = 0.00 | Y = 22.70 | Z = 45.73 |
| α = 53.18 | β = 0.00 | γ = 0.00 |

Decentering (7):

| | | |
|---|---|---|
| X = 0.00 | Y = 26.18 | Z = 49.24 |
| α = 44.70 | β = 0.00 | γ = 0.00 |

HOE surface (1):

| | | |
|---|---|---|
| HV1 = REA | HV2 = REA | HOR = 1 |
| HX1 = 0.0 | HY1 = 0.0 | HZ1 = 0.0 |
| HX2 = 0.0 | HY2 = 0.0 | HZ2 = 0.0 |
| HWL (1$^{st}$ layer) = 630 | HWL (2$^{nd}$ layer) = 520 | HWL (3$^{rd}$ layer) = 470 |
| $H_2 = -1.3521 \times 10^{-4}$ | $H_3 = -1.9729 \times 10^{-4}$ | $H_5 = -3.6827 \times 10^{-4}$ |
| $H_7 = 7.1422 \times 10^{-6}$ | $H_9 = -1.6569 \times 10^{-6}$ | $H_{10} = -2.9477 \times 10^{-7}$ |
| $H_{12} = 1.1841 \times 10^{-6}$ | $H_{14} = 7.7644 \times 10^{-7}$ | $H_{16} = -1.4507 \times 10^{-8}$ |
| $H_{18} = -3.5455 \times 10^{-8}$ | $H_{20} = 6.1354 \times 10^{-8}$ | $H_{21} = -3.3323 \times 10^{-10}$ |
| $H_{23} = 2.1818 \times 10^{-9}$ | $H_{25} = -1.1143 \times 10^{-8}$ | $H_{27} = -1.4457 \times 10^{-9}$ |
| Power of entire system: | X direction | Y direction |
| | 0.034 | 0.036 |

Conditions:

| | |
|---|---|
| Condition (1), (3), (5) | 0.02352 |
| Condition (2), (4), (6) | −0.01062 |
| Condition (7), (8), (9) | 0.020574 |

Sign of X-direction power of HOE: positive

Third Embodiment

Figure 5:
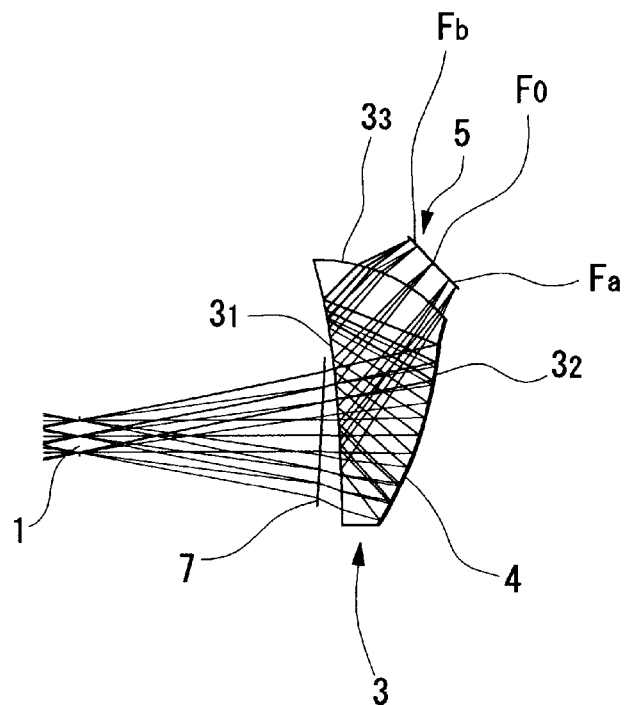
FIG. 5 is a sectional view of an image observation optical system according to the third embodiment of the present invention taken along Y-Z plane in which the optical axis lies.

As shown in FIG. 5, in the image observation optical system of the third embodiment, the eyepiece optical system includes a prism 3 having a positive refracting power, a reflection-type HOE 4 and a transmission-type HOE 7.

The prism 3 is provided with a first surface $3_1$ through a third surface $3_3$. Each of the first surface $3_1$ and the third surface $3_3$ is shaped as a rotationally asymmetric free curved surface, and the second surface $3_2$ is shaped as a spherical surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

The HOE 4 is applied to the second surface $3_2$ of the prism 3.

The HOE 7 is disposed between the exit pupil 1 and the first surface $3_1$ of the prism 3.

According to the present embodiment, after entering the prism 3 via the third surface $3_3$ thereof and being reflected at the first surface $3_1$, light from the LCD 5 is reflected by diffraction at the HOE 4 applied to the second surface $3_2$, and exits out of the prism via the first surface $3_1$ thereof. Then, after being transmitted through the HOE 7 by diffraction, the light is imaged, without being imaged intermediately, on the retina of the eye of the observer not shown, which is positioned at the exit pupil 1.

According to the present embodiment, a 0.55-inch type LCD is employed. Regarding the view field angle, horizontal field angle is 30° and vertical field angle is 22.8°, with pupil diameter of 4.0 mm. Also, observation wavelength range is ±20 nm in reference to each of B: 470 nm, G: 520 nm, R: 630 nm.

The numerical data of the third embodiment is shown below.

Numerical Data 3

Half field angle: 15.0° in X direction, 11.4° in Y direction
Entrance pupil diameter: φ4

| Surface Arrange. Number | Radius of Curvature | Surface Separation | Decentering | Refractive Index | Abbe's Number | |
|---|---|---|---|---|---|---|
| object surface | ∞ | −1000.00 | | | | |
| 1 | stop surface | 0.00 | decentering (1) | | | |
| 2 | ∞ | 0.00 | decentering (2) | | | HOE surface (1) |
| 3 | FFS ① | 0.00 | decentering (3) | 1.5163 | 64.1 | |

-continued

| | | | | | |
|---|---|---|---|---|---|
| 4 | −55.35 | | 0.00 | decentering (4) | |
| 5 | −55.35 | reflecting surface | 0.00 | decentering (4) | |
| 6 | −55.35 | | 0.00 | decentering (4) | 1.5163 64.1 |
| 7 | FFS ① | reflecting surface | 0.00 | decentering (3) | 1.5163 64.1 |
| 8 | FFS ② | | 0.00 | decentering (5) | |
| image surface | ∞ | | 0.00 | decentering (6) | |

FFS ①:

$C_4 = -3.5961 \times 10^{-3}$   $C_6 = -2.0707 \times 10^{-3}$   $C_8 = -2.1572 \times 10^{-5}$
$C_{10} = -3.3973 \times 10^{-5}$   $C_{11} = -3.6209 \times 10^{-6}$   $C_{13} = -8.8721 \times 10^{-6}$
$C_{15} = -2.3582 \times 10^{-6}$

FFS ②:

$C_4 = -3.1505 \times 10^{-2}$   $C_6 = -2.4449 \times 10^{-2}$   $C_8 = 2.2680 \times 10^{-4}$
$C_{11} = 2.9376 \times 10^{-5}$   $C_{13} = 1.4803 \times 10^{-5}$   $C_{15} = -4.2578 \times 10^{-6}$ Decentering (1):

$X = 0.00$   $Y = 0.00$   $Z = 0.00$
$\alpha = 0.00$   $\beta = 0.00$   $\gamma = 0.00$ Decentering (2):

$X = 0.00$   $Y = 3.18$   $Z = 31.00$
$\alpha = -3.00$   $\beta = 0.00$   $\gamma = 0.00$ Decentering (3):

$X = 0.00$   $Y = 0.00$   $Z = 33.18$
$\alpha = 3.00$   $\beta = 0.00$   $\gamma = 0.00$ Decentering (4):

$X = 0.00$   $Y = 0.00$   $Z = 43.37$
$\alpha = -18.23$   $\beta = 0.00$   $\gamma = 0.00$ Decentering (5):

$X = 0.00$   $Y = 19.51$   $Z = 42.13$
$\alpha = 56.93$   $\beta = 0.00$   $\gamma = 0.00$ Decentering (6):

$X = 0.00$   $Y = 22.20$   $Z = 45.24$
$\alpha = 44.33$   $\beta = 0.00$   $\gamma = 0.00$ HOE surface (1):

HV1 = REA   HV2 = REA   HOR = 1
HX1 = 0.0   HY1 = 0.0   HZ1 = 0.0
HX2 = 0.0   HY2 = 0.0   HZ2 = 0.0
HWL (1st layer) = 630   HWL (2nd layer) = 520   HWL (3rd layer) = 470
$H_2 = 2.8092 \times 10^{-2}$   $H_3 = 1.5220 \times 10^{-3}$   $H_5 = 6.4269 \times 10^{-3}$
$H_7 = -2.0851 \times 10^{-4}$   $H_9 = -1.3663 \times 10^{-4}$   $H_{10} = 2.7969 \times 10^{-6}$
$H_{12} = 3.0519 \times 10^{-5}$   $H_{14} = 2.0315 \times 10^{-5}$   $H_{16} = 1.3880 \times 10^{-6}$
$H_{18} = 3.1198 \times 10^{-6}$   $H_{20} = 5.6693 \times 10^{-8}$   $H_{21} = 7.8767 \times 10^{-8}$
$H_{23} = 6.4495 \times 10^{-8}$   $H_{25} = 4.4701 \times 10^{-8}$   $H_{27} = -3.3360 \times 10^{-8}$ HOE surface (2):

HV1 = REA   HV2 = REA   HOR = 1
HX1 = 0.0   HY1 = 0.0   HZ1 = 0.0
HX2 = 0.0   HY2 = 0.0   HZ2 = 0.0
HWL (1st layer) = 630   HWL (2nd layer) = 520   HWL (3rd layer) = 470
$H_2 = 1.6204 \times 10^{-2}$   $H_3 = -2.1630 \times 10^{-3}$   $H_5 = -4.9648 \times 10^{-3}$
$H_7 = 8.6587 \times 10^{-5}$   $H_9 = 8.7901 \times 10^{-5}$   $H_{10} = 2.1618 \times 10^{-6}$
$H_{12} = -1.3028 \times 10^{-6}$   $H_{14} = -3.0085 \times 10^{-6}$   $H_{16} = -8.2023 \times 10^{-8}$
$H_{18} = -1.7863 \times 10^{-7}$   $H_{20} = 3.7760 \times 10^{-8}$   $H_{21} = -1.9525 \times 10^{-8}$
$H_{23} = -1.7408 \times 10^{-8}$   $H_{25} = -1.1208 \times 10^{-8}$   $H_{27} = 2.8284 \times 10^{-9}$ Power of entire system:   X direction   Y direction
                          0.047         0.047

Conditions:

Condition (1), (3), (5)   0.380181
Condition (2), (4), (6)   0.145371
Condition (7)             0.210195
Sign of X-direction power of HOE: positive

Fourth Embodiment

Figure 7:
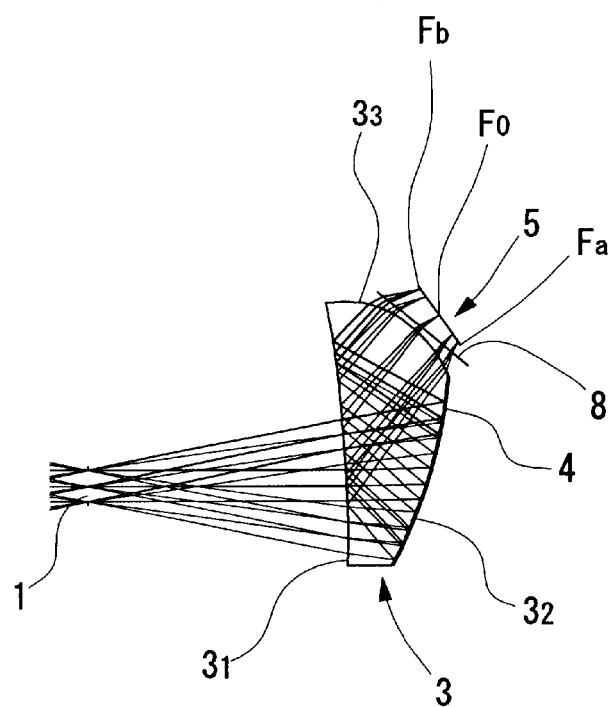
FIG. 7 is a sectional view of an image observation optical system according to the fourth embodiment of the present invention taken along Y-Z plane in which the optical axis lies.
Figure 8A:
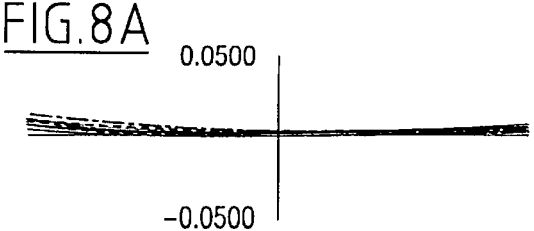
FIGS. 8A–8L are lateral aberration diagrams of the image observation optical system of the fourth embodiment.
Figure 8B:
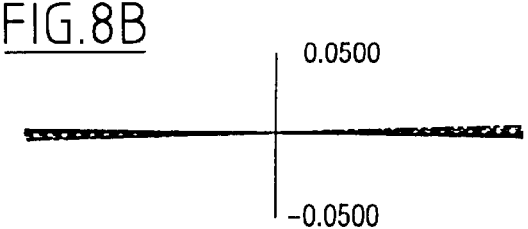
Figure 8C:
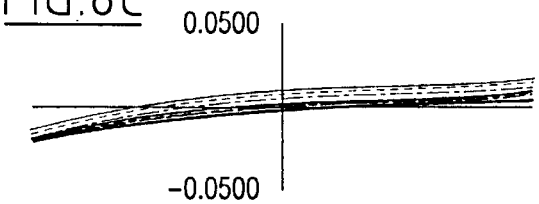
Figure 8D:
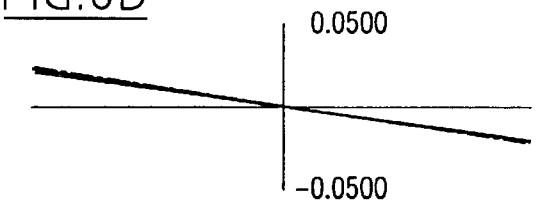
Figure 8E:
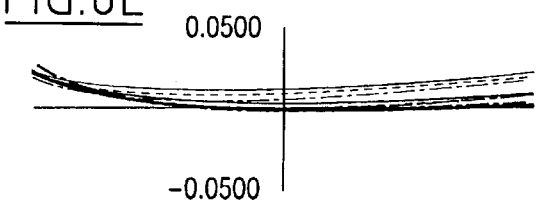
Figure 8F:
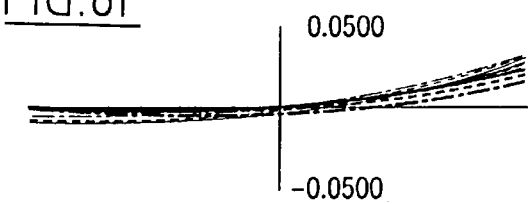
Figure 8G:
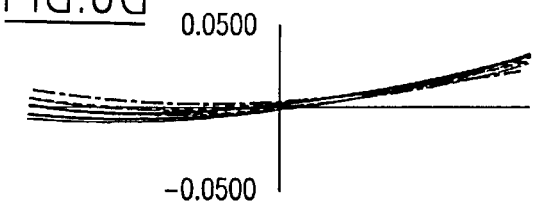
Figure 8H:
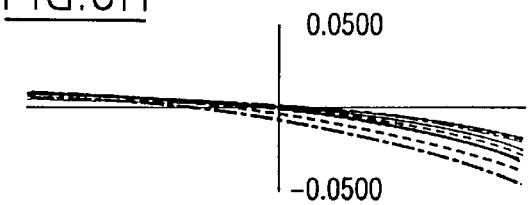
Figure 8I:
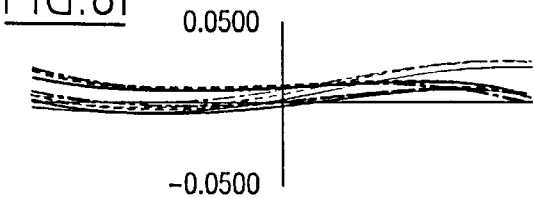
Figure 8J:
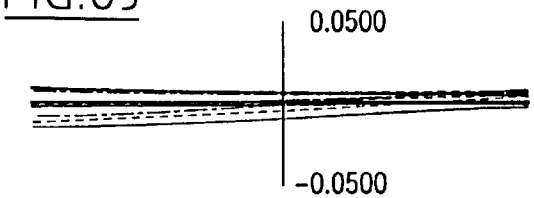
Figure 8K:
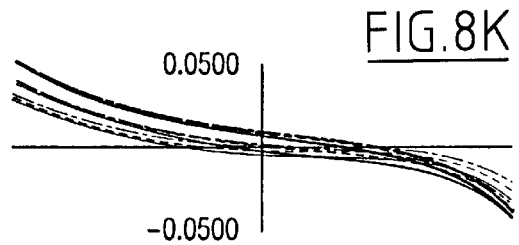
Figure 8L:
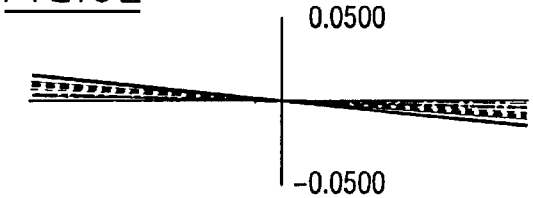

As shown in FIG. 7, in the image observation optical system of the fourth embodiment, the eyepiece optical system includes a prism 3 having a positive refracting power, a reflection-type HOE 4, and a transmission-type HOE 8.

The prism 3 is provided with a first surface $3_1$ through a third surface $3_3$. Each of the first surface $3_1$ and the third surface $3_3$ is shaped as a rotationally asymmetric free curved surface, and the second surface $3_2$ is shaped as a spherical surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

The HOE 4 is applied to the second surface $3_2$ of the prism 3.

The HOE 8 is disposed between the LCD 5 and the third surface $3_3$ of the prism 3.

After being transmitted through the HOE 8 by diffraction, entering the prism via the third surface $3_3$ thereof and being reflected at the first surface $3_1$, light from the LCD 5 is reflected by diffraction at the HOE 4 applied to the second surface $3_2$, exits out of the prism via the first surface $3_1$ thereof, and then is imaged, without being imaged intermediately, on the retina of the eye of the observer not shown, which is positioned at the exit pupil 1.

According to the present embodiment, a 0.55-inch type LCD is employed. Regarding the view field angle, horizontal field angle is 30° and vertical field angle is 22.8°, with pupil diameter of 4.0 mm. Also, observation wavelength range is ±20 nm in reference to each of B: 470 nm, G: 520 nm, R: 630 nm.

The numerical data of the fourth embodiment is shown below.

Numerical Data 4

Half field angle: 15.0° in X direction, 11.4° in Y direction
Entrance pupil diameter: φ4

| Surface Arrange. Number | Radius of Curvature | Surface Separation | Decentering | Refractive Index | Abbe's Number | |
|---|---|---|---|---|---|---|
| object surface | ∞ | −1000.00 | | | | |
| 1 | stop surface | | 0.00 decentering (1) | | | |
| 2 | FFS ① | | 0.00 decentering (2) | 1.5163 | 64.1 | |
| 3 | −60.08 | | 0.00 decentering (3) | | | |
| 4 | −60.08 | reflecting surface | 0.00 decentering (3) | | | HOE surface (1) |
| 5 | −60.08 | | 0.00 decentering (3) | 1.5163 | 64.1 | |
| 6 | FFS ① | reflecting surface | 0.00 decentering (2) | 1.5163 | 64.1 | |
| 7 | FFS ② | | 0.00 decentering (4) | | | |
| 8 | 0.00 | | 0.00 decentering (5) | | | HOE surface (2) |
| image surface | 0.00 | | 0.00 decentering (6) | | | |

FFS ①:

$C_4 = -1.9551 \times 10^{-3}$  $C_6 = -2.4158 \times 10^{-3}$  $C_8 = -1.8284 \times 10^{-5}$
$C_{10} = 1.0142 \times 10^{-4}$  $C_{11} = -2.5199 \times 10^{-6}$  $C_{13} = -5.8263 \times 10^{-6}$
$C_{15} = -5.0628 \times 10^{-6}$

FFS ②:

$C_4 = -3.2163 \times 10^{-2}$  $C_6 = -2.5384 \times 10^{-2}$  $C_8 = -4.3281 \times 10^{-4}$
$C_{11} = 4.5846 \times 10^{-5}$  $C_{13} = 1.0823 \times 10^{-4}$  $C_{15} = -1.2862 \times 10^{-4}$ Decentering (1):

X = 0.00    Y = 0.00    Z = 0.00
α = 0.00    β = 0.00    γ = 0.00

Decentering (2):

X = 0.00    Y = 0.00    Z = 33.00
α = 2.92    β = 0.00    γ = 0.00

Decentering (3):

X = 0.00    Y = 0.00    Z = 43.14
α = −18.21  β = 0.00    γ = 0.00

Decentering (4):

X = 0.00    Y = 19.39   Z = 42.14
α = 47.28   β = 0.00    γ = 0.00

Decentering (5):

X = 0.00    Y = 0.00    Z = 0.00
α = 27.12   β = 33.90   γ = 50.92

Decentering (6):

X = 0.00    Y = 0.00    Z = 0.00
α = 21.56   β = 44.92   γ = 33.05

-continued

HOE surface (1):

| | | |
|---|---|---|
| HV1 = REA | HV2 = REA | HOR = 1 |
| HX1 = 0.0 | HY1 = 0.0 | HZ1 = 0.0 |
| HX2 = 0.0 | HY2 = 0.0 | HZ2 = 0.0 |
| HWL (1st layer) = 630 | HWL (2nd layer) = 520 | HWL (3rd layer) = 470 |
| $H_2 = 3.4766 \times 10^{-2}$ | $H_3 = -7.2076 \times 10^{-4}$ | $H_5 = 1.4877 \times 10^{-3}$ |
| $H_7 = -9.4600 \times 10^{-5}$ | $H_9 = -1.5510 \times 10^{-5}$ | $H_{10} = 2.1671 \times 10^{-6}$ |
| $H_{12} = 1.8003 \times 10^{-6}$ | $H_{14} = -5.3603 \times 10^{-6}$ | $H_{16} = 2.5751 \times 10^{-7}$ |
| $H_{18} = 4.0221 \times 10^{-7}$ | $H_{20} = 4.1907 \times 10^{-7}$ | $H_{21} = 3.0352 \times 10^{-9}$ |
| $H_{23} = 2.4963 \times 10^{-10}$ | $H_{25} = 1.6647 \times 10^{-8}$ | $H_{27} = 3.1432 \times 10^{-8}$ |

HOE surface (2):

| | | |
|---|---|---|
| HV1 = REA | HV2 = REA | HOR = 1 |
| HX1 = 0.0 | HY1 = 0.0 | HZ1 = 0.0 |
| HX2 = 0.0 | HY2 = 0.0 | HZ2 = 0.0 |
| HWL (1st layer) = 630 | HWL (2nd layer) = 520 | HWL (3rd layer) = 470 |
| $H_2 = -2.3406 \times 10^{-1}$ | $H_3 = -1.5776 \times 10^{-3}$ | $H_5 = 2.1827 \times 10^{-3}$ |
| $H_7 = -2.8696 \times 10^{-3}$ | $H_9 = -9.2219 \times 10^{-5}$ | $H_{10} = -5.7504 \times 10^{-5}$ |
| $H_{12} = -2.8604 \times 10^{-4}$ | $H_{14} = -1.5310 \times 10^{-7}$ | $H_{16} = -5.4533 \times 10^{-6}$ |
| $H_{18} = -4.8180 \times 10^{-6}$ | $H_{20} = 5.8645 \times 10^{-7}$ | $H_{21} = -6.0080 \times 10^{-7}$ |
| Power of entire system: | X direction 0.047 | Y direction 0.047 |

Conditions:

| | |
|---|---|
| Condition (1), (3), (5) | 0.019461 |
| Condition (2), (4), (6) | −0.18002 |
| Condition (7), (8), (9) | −0.0627 |
| Sign of X-direction power of HOE: positive/negative | |

Next, configuration examples on the technical standard will be presented for the purpose of comparison with the above-described preferred embodiments of the present invention. It is noted that the sectional views and the lateral aberration diagrams directed to these examples are drawn in the same manner as those directed for the above-described embodiments.

FIRST REFERENCE EXAMPLE

Figure 9:
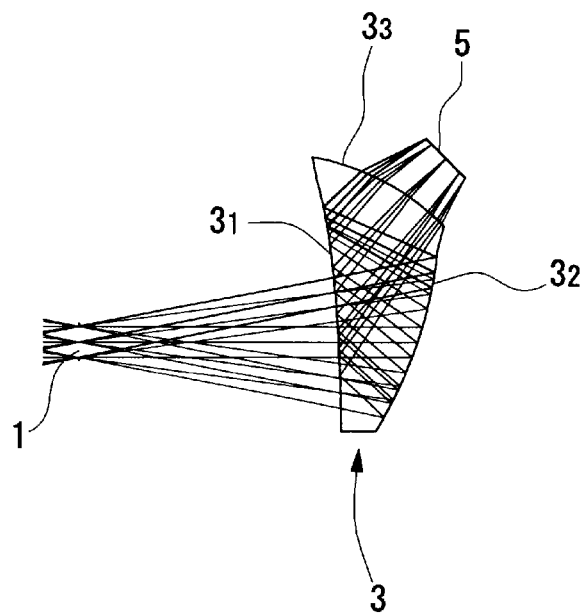
FIG. 9 is a sectional view taken along Y-Z plane, in which the optical axis lies, of a conventional image observation optical system according to the first reference example set against the image observation optical system of each embodiment of the present invention.

As shown in FIG. 9, in the image observation optical system of the first reference example, the eyepiece optical system is composed only of a prism 3 having a positive refracting power.

The prism 3 is provided with a first surface $3_1$ through a third surface $3_3$, each of which is shaped as a rotationally asymmetric free curved surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

According to the present reference example, after entering the prism 3 via the third surface $3_3$ thereof and being reflected at the first surface $3_1$ and at the second surface $3_2$, light from the LCD 5 is imaged, without being imaged intermediately, on the retina of the eye of the observer not shown, which is positioned at the exit pupil 1.

According to the present reference example, a 0.7-inch type LCD is employed. Regarding the view field angle, horizontal field angle is 28° and vertical field angle is 21.2°, with pupil diameter of 4.0 mm. Also, observation wavelength range is 435 nm–656 nm.

SECOND REFERENCE EXAMPLE

Figure 11:
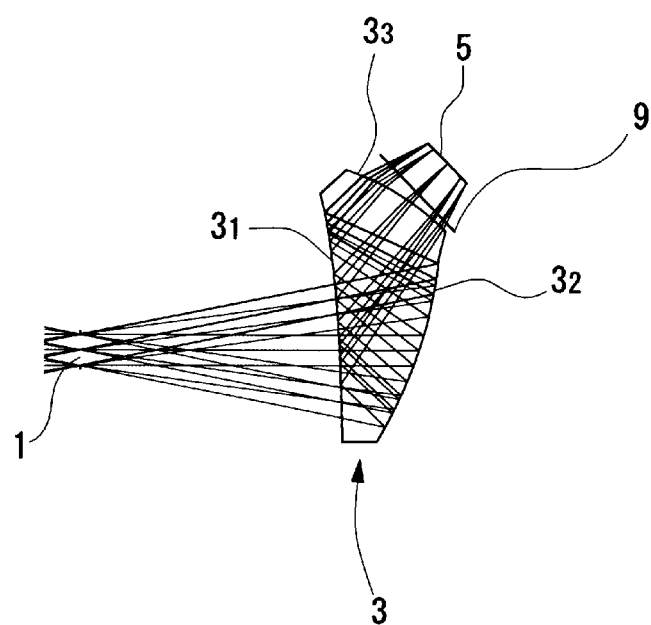
FIG. 11 is a sectional view taken along Y-Z plane, in which the optical axis lies, of a conventional image observation optical system according to the second reference example set against the image observation optical system of each embodiment of the present invention.

As shown in FIG. 11, in the image observation optical system of the second reference example, the eyepiece optical system includes a prism 3 having a positive refracting power and a DOE 9.

The prism 3 is provided with a first surface $3_1$ through a third surface $3_3$, each of which is shaped as a rotationally asymmetric free curved surface. The first surface $3_1$ is constructed and arranged to provide, on the very same surface, a region acting as a first reflecting surface and a region acting as an exit surface. The second surface $3_2$ is constructed and arranged as a second reflecting surface. The third surface $3_3$ is constructed and arranged as an entrance surface.

The DOE 9 is disposed between the LCD 5 and the third surface $3_3$ of the prism 3.

According to the present reference example, after being transmitted through the DOE 9 by diffraction, entering the prism via the third surface $3_3$ thereof and being reflected at the first surface $3_1$ and at the second surface $3_2$, light from the LCD 5 is imaged, without being imaged intermediately, on the retina of the eye of the observer not shown, which is positioned at the exit pupil 1.

According to the present reference example, a 0.7-inch type LCD is employed. Regarding the view field angle, horizontal field angle is 28° with pupil diameter of 4.0 mm. Also, observation wavelength range is 435 nm–656 nm.

In a case where an eyepiece optical system is composed only of a prism with free curved surfaces as in the first reference example, a large amount of lateral aberrations remains, as shown in FIGS. 10A–10L. In a case where a DOE is added to the optical system as in the second reference example, the amount of lateral aberrations is better reduced than in the case of the first reference example but still largely remains, as shown in FIGS. 12A–12L.

In contrast, according to the first to fourth embodiments of the present invention, the lateral aberrations are compensated in good condition within each wavelength band of R (470±20 nm), G (520±20 nm), and B (470±20 nm). Furthermore, the lateral aberrations are compensated in good condition between the main wavelengths of the respective wavelength bands.

Figure 13:
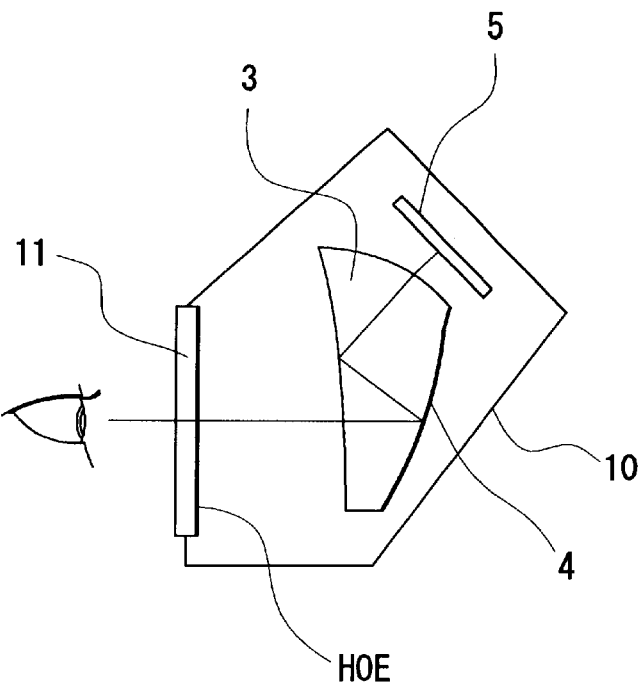
FIG. 13 is a sectional view showing an example in which the image observation optical system of the present invention is provided with a dust shield member.

It is preferred that the HOE used in each of the above-described embodiments is covered with a dust shield member. Also, in a configuration of FIG. 5 embodiment or the like, the HOE 7 may be applied to the inner side of a cover member 11, which forms a part of a dust shield member 10 and is made of transparent material such as glass or plastic, as shown in FIG. 13.

Figure 14:
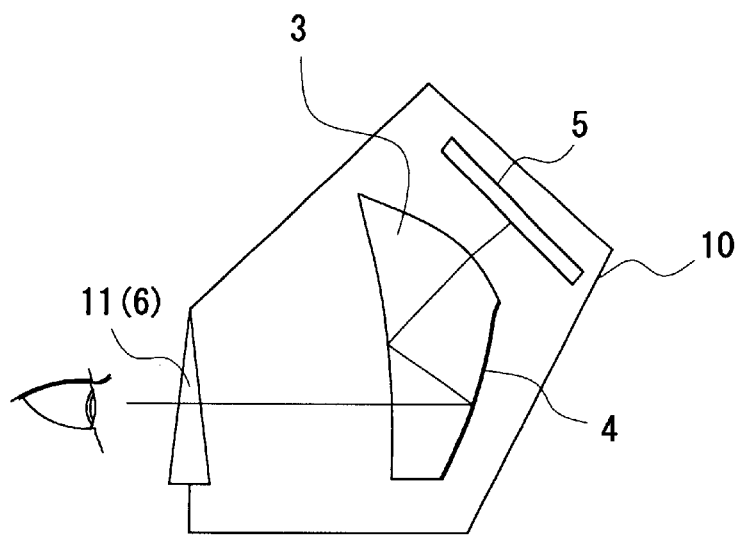
FIG. 14 is a sectional view showing an example in which the image observation optical system of the present invention is provided with a dust shield member.

Also, a wedge prism as used in the configuration of FIG. 1 embodiment or the like may be disposed between the exit pupil 1 and the prism 3. In this case, the wedge prism 6 may be used as the dust shield member 11 also, as shown in FIG. 14.

Figure 15A:
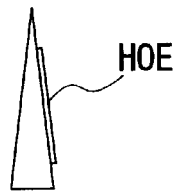
FIGS. 15A–15B are explanatory views each showing an essential portion of a modified example in which a wedge prism is used in the image observation optical system of the present invention. Specifically.
Figure 15B:

Furthermore, as shown in FIG. 15A, the HOE used in the present invention maybe applied to a plane surface of a wedge prism instead of the prism 3. Alternatively, as shown in FIG. 15B, the HOE may be sandwiched between two wedge prisms, where the space between is sealed with sealing material on the top and bottom sides.

Also, the prism used in the image observation optical system of the present invention is not limited to the types of the above-described embodiments. Prisms shown in FIGS. 12–16 may be used.

Figure 16:
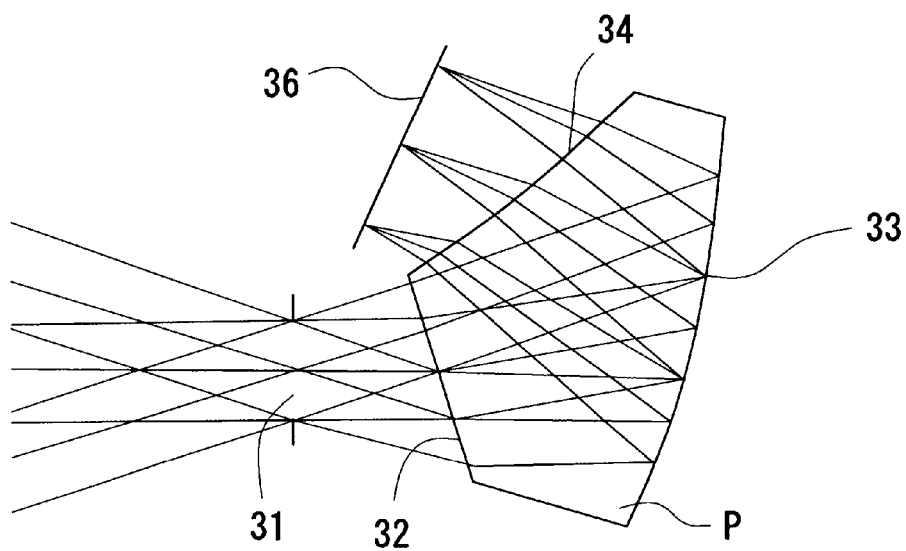
FIG. 16 is an example of a prism applicable to the prism member of the image observation optical system of the present invention.

In the case of FIG. 16, a prism P is provided with a first surface 32, a second surface 33, and a third surface 34. The first surface 32, the second surface 33, and the third surface 34 are constructed and arranged as an exit surface, a reflecting surface, and an entrance surface, respectively. The prism P is configured so that light from a LCD 36 enters the prism as being refracted at the third surface 34 thereof, is reflected at the second prism 33, exits out of the prism as being refracted at the first surface 32 thereof, and then is imaged on the retina of the eye of the observer not shown, which is positioned at an exit pupil 31.

Figure 17:
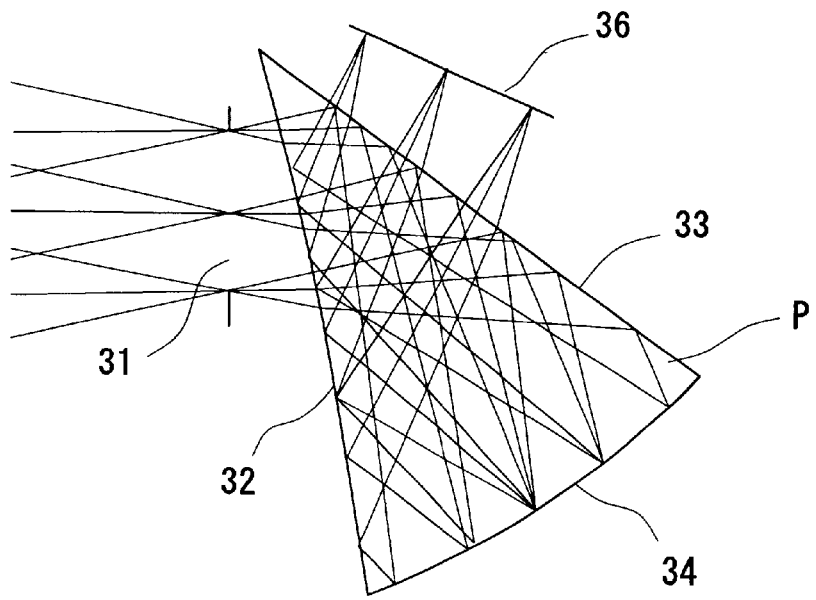
FIG. 17 is another example of a prism applicable to the prism member of the observation optical system of the present invention.

In the case of FIG. 17, a prism P is provided with a first surface 32, a second surface 33, and a third surface 34. The first surface 32 is constructed and arranged to act both as a first reflecting surface and an exit surface. The second surface 33 is constructed and arranged to act both as a third reflecting surface and an entrance surface. The third surface 34 is constructed and arranged as a second reflecting surface. The prism P is configured so that light from a LCD 36 enters the prism as being refracted at the second surface 33 thereof, is reflected at the first surface 32, and is reflected at the third surface 34, then is reflected at the second surface 33, exits out of the prism as being refracted at the first surface 32 thereof, and is imaged on the retina of the eye of the observer not shown, which is positioned at an exit pupil 31.

Figure 18:
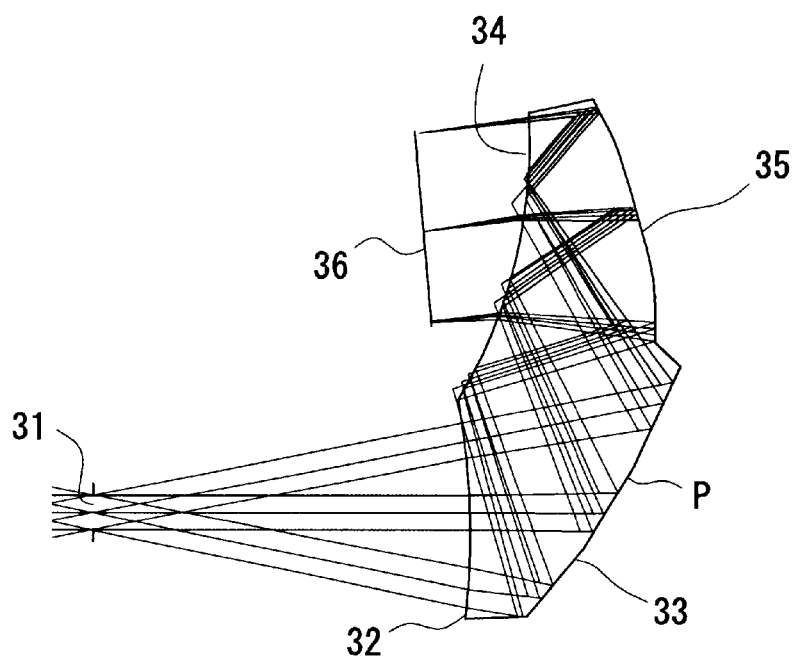
FIG. 18 is still another example of a prism applicable to the prism member of the observation optical system of the present invention.

In the case of FIG. 18, a prism P is provided with a first surface 32, a second surface 33, a third surface 34, and a fourth surface 35. The first surface 32 is constructed and arranged as an exit surface. The second surface 33 is constructed and arranged as a third reflecting surface. The third surface 34 is constructed and arranged to act both as an entrance surface and a second reflecting surface. The fourth surface 35 is constructed and arranged as a first reflecting surface. The prism P is configured so that light from a LCD 36 enters the prism as being refracted at the third surface 34 thereof, is reflected at the fourth surface 35, then is reflected at the third surface 34, is reflected at the second surface 33, exits out of the prism as being refracted at the first surface 32 thereof, and is imaged on the retina of the eye of the observer not shown, which is positioned at an exit pupil 31.

Figure 19:
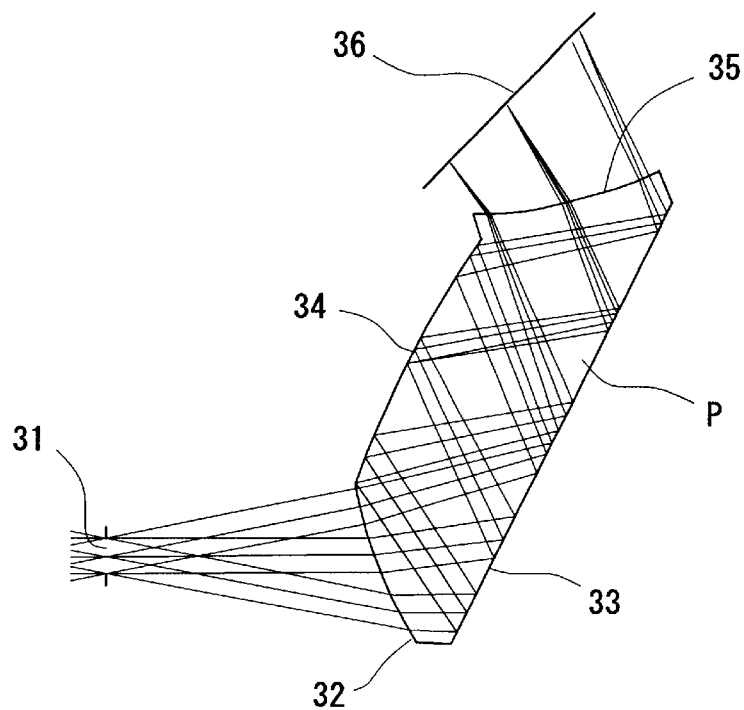
FIG. 19 is still another example of a prism applicable to the prism member of the observation optical system of the present invention.

In the case of FIG. 19, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region acting as a first reflecting surface and a region acting as a third reflecting surface. The third surface 34 is constructed and arranged as a second reflecting surface. The fourth surface 35 is constructed and arranged as an entrance surface. The prism P is configured so that light from a LCD 36 enters the prism as being refracted at the fourth surface 35 thereof, is reflected at the first reflecting surface on the second surface 33, is reflected at the third surface 34, then is reflected at the third reflecting surface on the second surface 33, exits out of the prism as being refracted at the first surface 32 thereof, and is imaged on the retina of the eye of the observer not shown, which is positioned at an exit pupil 31.

Figure 20:
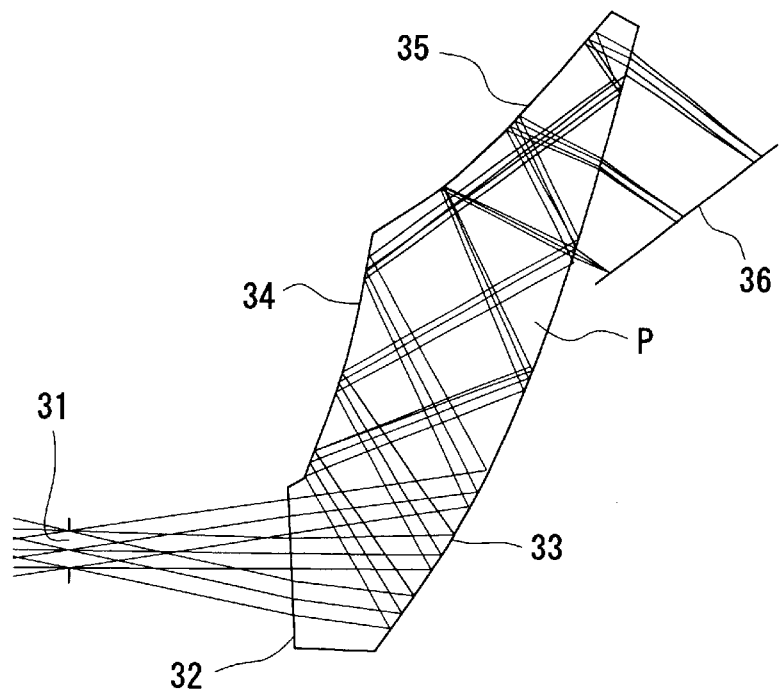
FIG. 20 is still another example of a prism applicable to the prism member of the observation optical system of the present invention.

In the case of FIG. 20, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region that acts both as an entrance surface and a second reflecting surface and a region that acts as a fourth reflecting surface. The third surface 34 is constructed and arranged as a third reflecting surface. The fourth surface 35 is constructed and arranged as a first reflecting surface. The prism P is configured so that light from a LCD 36 enters the prism as being refracted at the entrance surface thereof on the second surface 33, is reflected at the fourth surface 35, then is reflected at the second reflecting surface on the second surface 33, is reflected at the third surface 34, then is reflected at the fourth reflecting surface on the second surface 33, exits out of the prism as being refracted at the first surface 32 thereof, and is imaged on the retina of the eye of the observer not shown, which is positioned at an exit pupil 31.

Figure 21:
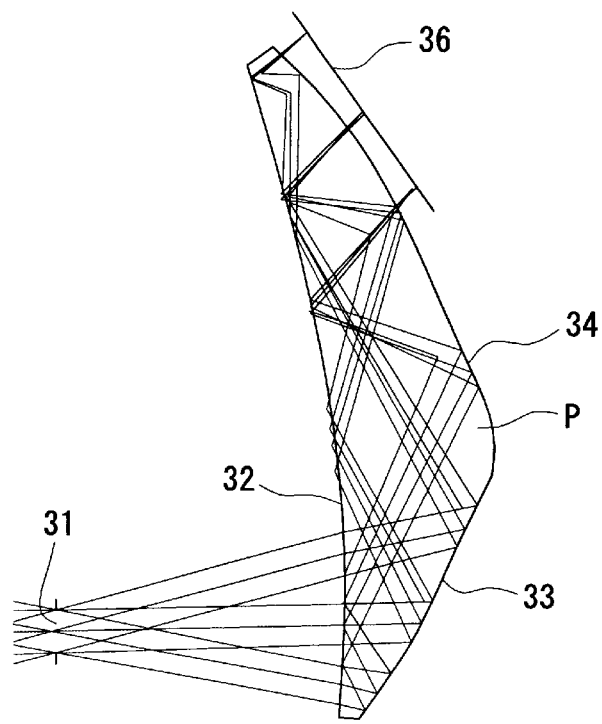
FIG. 21 is still another example of a prism applicable to the prism member of the observation optical system of the present invention.

In the case of FIG. 21, a prism P is provided with a first surface 32, a second surface 33, and a third surface 34. The first surface 32 is constructed and arranged to act all in one as a first reflecting surface, a third reflecting surface and an exit surface. The second surface 33 is constructed and arranged as a fourth reflecting surface. The third surface 34 is constructed and arranged to act both as an entrance surface and a second reflecting surface. The prism P is configured so that light from a LCD 36 enters the prism as being refracted at the entrance surface thereof on the third surface 34, is reflected at the first reflecting surface on the first surface 32, then is reflected at the second reflecting surface on the third surface 34, is reflected at the third reflecting surface on the first surface 32, is reflected at the second surface 33, then exits out of the prism as being refracted at the exit surface thereof on the first surface 32, and is imaged on the retina of the eye of the observer not shown, which is positioned at an exit pupil 31.

Figure 22:
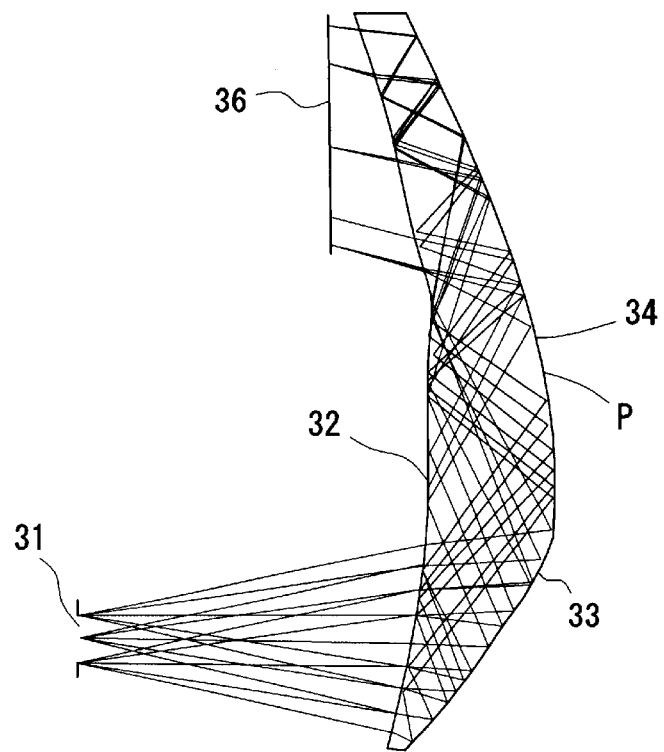
FIG. 22 is still another example of a prism applicable to the prism member of the observation optical system of the present invention.

In the case of FIG. 22, a prism P is provided with a first surface 32, a second surface 33, and a third surface 34. The first surface 32 is constructed and arranged to act all in one as an entrance surface, a second reflecting surface, a fourth reflecting surface and an exit surface. The second surface 33 is constructed and arranged as a fifth reflecting surface. The third surface 34 is constructed and arranged to act both as a first reflecting surface and a third reflecting surface. The prism P is configured so that light from a LCD 36 enters the prism as being refracted at the entrance surface thereof on the first surface 32, is reflected at the first reflecting surface on the third surface 34, then is reflected at the second reflecting surface on the first surface 32, is reflected at the third reflecting surface on the third surface 34, then is reflected at the fourth reflecting surface on the first surface 32, is reflected at the second surface 33, then exits out of the prism as being refracted at the exit surface thereof on the first surface 32, and is imaged on the retina of the eye of the observer not shown, which is positioned at an exit pupil 31.

Figure 23:
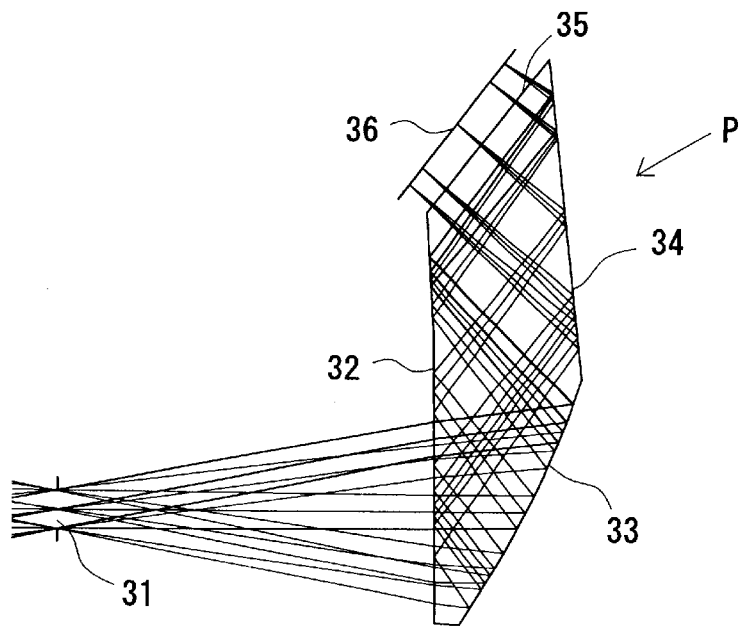
FIG. 23 is still another example of a prism applicable to the prism member of the observation optical system of the present invention.

In the case of FIG. 23, a prism P is provided with a first surface 32, a second surface 33, a third surface 34, and a fourth surface 35. The first surface 32 is constructed and arranged to act both as a second reflecting surface and an exit surface. The second surface 33 is constructed and arranged as a third reflecting surface. The third surface 34 is constructed and arranged as a first reflecting surface. The fourth surface 35 is constructed and arranged as an entrance surface. The prism P is configured so that light from a LCD 36 enters the prism as being refracted at the fourth surface 35 thereof, is reflected at the third surface 34, then is reflected at the second reflecting surface on the first surface 32, is reflected at the second surface 33, exits out of the prism as being refracted at the exit surface thereof on the first surface 32, and is imaged on the retina of the eye of the observer not shown, which is positioned at an exit pupil 31.

Figure 24:
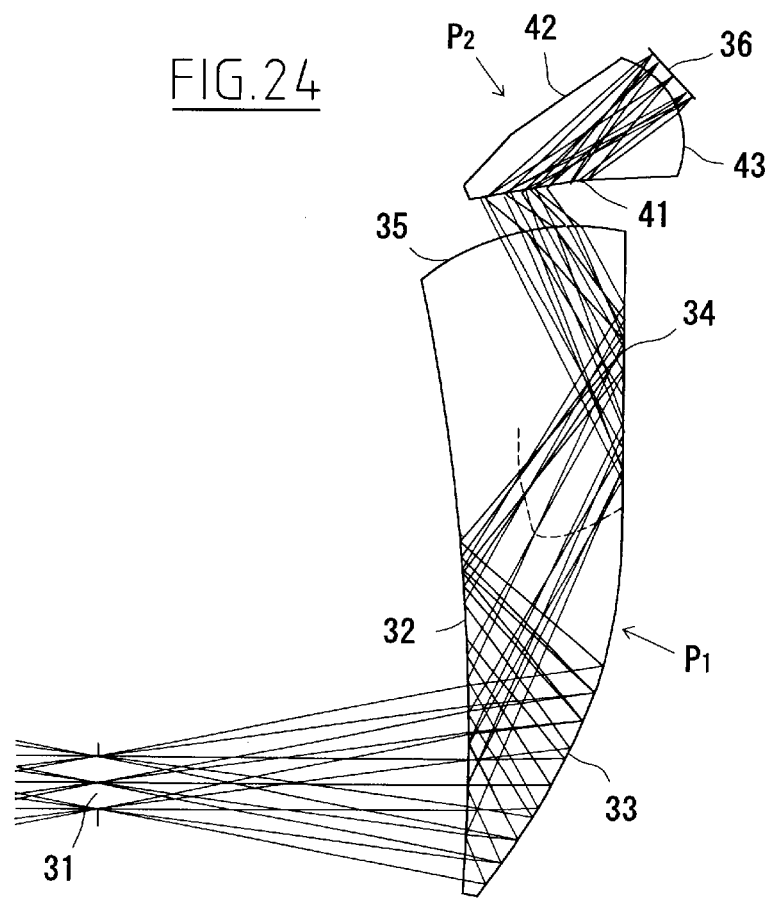
FIG. 24 is still another example of a prism applicable to the prism member of the observation optical system of the present invention.

In the case of FIG. 24, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42 and a third surface 43. The first surface 41 is constructed and arranged to act both as a first reflecting surface and an exit surface of the second prism P2. The second surface 42 is constructed and arranged as a second reflecting surface of the second prism P2. The third surface 43 is constructed and arranged as an entrance surface of the second prism P2.

The prism P is configured so that light from a LCD 36 enters the second prism P2 as being refracted at the third surface 43 thereof, is reflected at the first reflecting surface on the third surface 43, is reflected at the second surface 42, then exits out of the prism as being refracted at the first surface 41 thereof, enters the prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on the retina of the eye of the observer not shown, which is positioned at an exit pupil 31.

Figure 25:
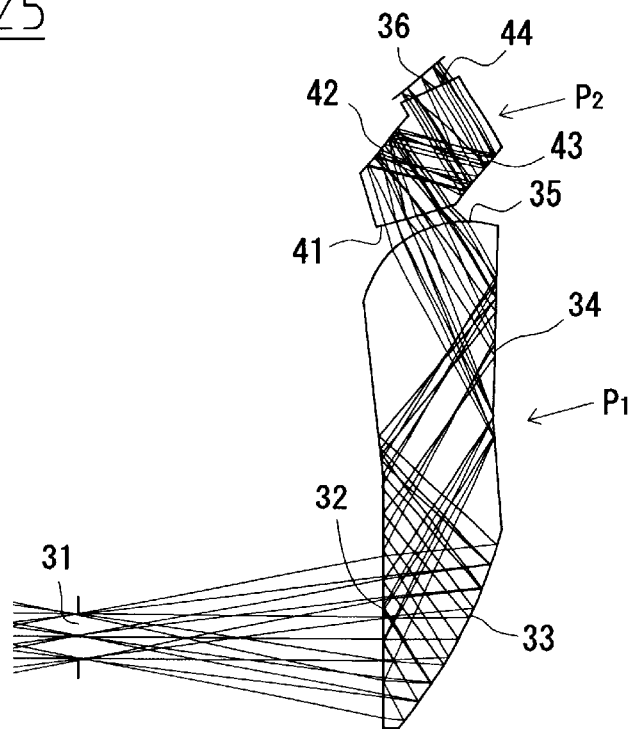
FIG. 25 is still another example of a prism applicable to the prism member of the observation optical system of the present invention.

In the case of FIG. 25, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from a LCD 36 enters the second prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on the retina of the eye of the observer not shown, which is positioned at an exit pupil 31.

Figure 26:
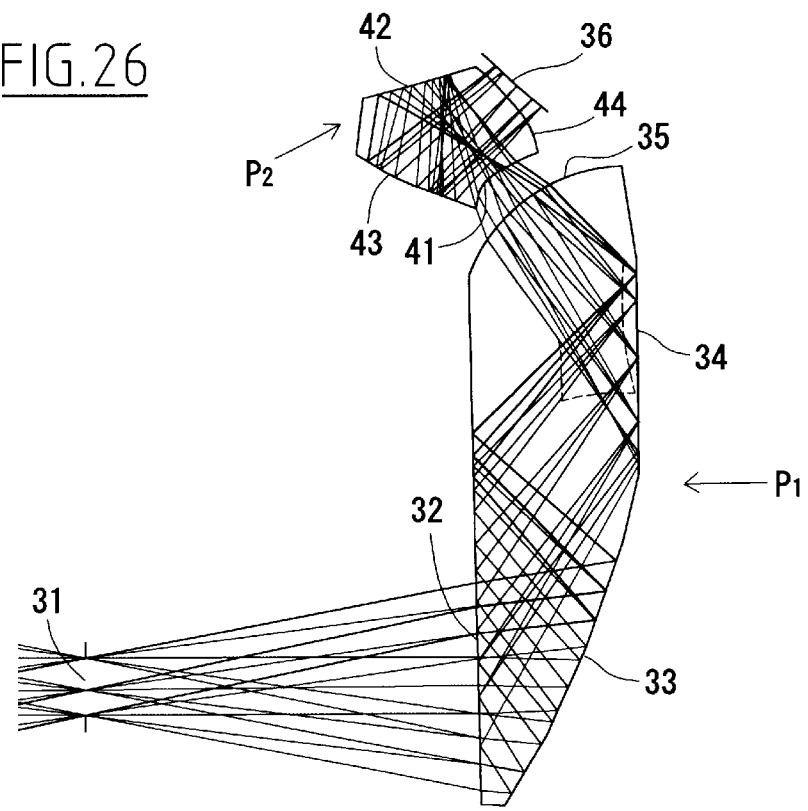
FIG. 26 is still another example of a prism applicable to the prism member of the observation optical system of the present invention.

In the case of FIG. 26, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from a LCD 36 enters the prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on the retina of the eye of the observer not shown, which is positioned at an exit pupil 31. The prism of FIG. 25 and the prism of FIG. 26 show the following difference in configuration. Regarding the path between the third surface and the fourth surface and the path between the first surface and the second surface in the second prism P2, they intersect each other according to FIG. 25, while they do not intersect each other according to FIG. 26.

Next, descriptions will be made of embodiments of an image display apparatus in which the above-described image observation optical system according to the present invention is realized.

Figure 27:
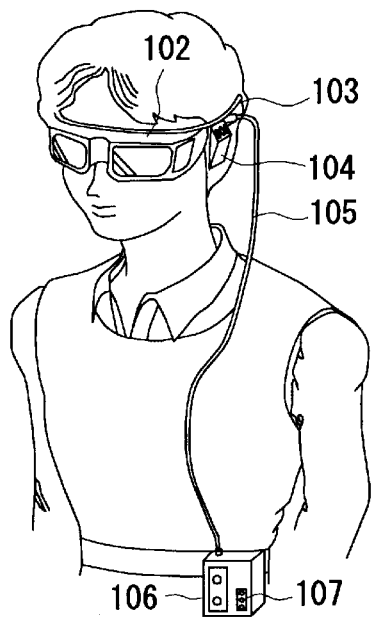
FIG. 27 is a view of a head-mount type binocular image display apparatus using the observation optical system according to the present invention, as it is fit to the head of an observer.
Figure 28:
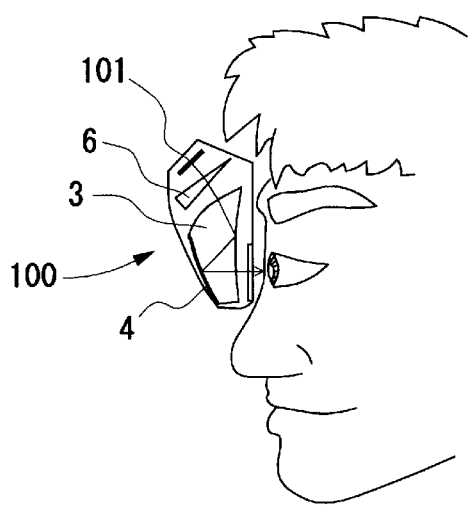
FIG. 28 is a sectional view of the apparatus shown in FIG. 27.

As an example, a head-mount type binocular image display apparatus is explained in reference to FIG. 27 and FIG. 28. As shown in FIG. 28, this apparatus is configured to use the observation optical system according to the present invention as an eyepiece optical system 100 provided with an image display element 5. A pair of such eyepiece optical systems 100 are provided and held spaced away from each other by the interpupillary distance, to forma stationary-type or portable-type image display apparatus such as a head-mount type image display apparatus for binocular observation.

The above-described observation optical system is used in a main frame 102 of the image display apparatus as an eyepiece optical system 100. A pair of such eyepiece optical systems 100 are provided as left and right systems. Image display elements 5 constructed of liquid crystal display elements are disposed on the respective image surfaces of the optical systems. As shown in FIG. 27, side-head frames 103 are coupled to the main frame 102 on the lateral sides thereof so as to hold the main frame 102 in front of the eyes of the observer. Although FIG. 28 does not show a configuration where spectacle lenses are integrally incorporated inside the main frame 102 of the image display apparatus, the image display apparatus may be configured to incorporate spectacle lenses.

Also, each of the side-head frame 103 is equipped with a speaker 104 so that the observer can enjoy stereophony, in addition to the image. The main frame 102 provided with the speakers 104 as described above is connected with a player unit 106 for a portable video cassette or the like via a video/audio transmission cord 105. The observer can enjoy image and sound upon holding the player unit 106 to an arbitrary position, for example to her or his waist belt position, as shown in the drawing. In FIG. 27, the reference numeral 107 represents a control section including a switch, a volume control etc. of the player unit 106. Electronic devices such as video processing and audio processing circuits are built in the main frame 102.

The end of the cord 105 may be formed as a jack to be plugged in an existing video deck etc. Also, the cord 105 may be connected with a TV tuner, which receives broadcasting waves, for observation of TV programs, or may be connected with a computer to receive images of computer graphics or text messages. Alternatively, the apparatus may be provided with an antenna for receiving external signals carried by radio waves, for the purpose of removing the cord, which is obstructive.

Figure 29:
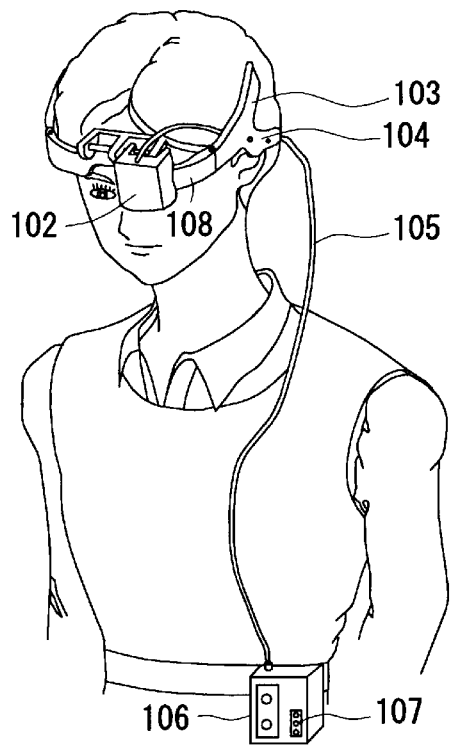
FIG. 29 is a view of a head-mount type monocular image display apparatus using the observation optical system according to the present invention, as it is fit to the head of an observer.

Also, as shown in FIG. 29, the observation optical system according to the present invention may be applied to a head-mount type monocular image display apparatus, which is designed so that an eyepiece optical system is held in front of either eye (in the drawing, in front of the left eye) of an observer. In this configuration, a main frame 102 which is provided with a set including an eyepiece optical system 100 and an image display element 5 is mounted on a front frame 108 at a position in front of the corresponding eye. Side-head frames 103 shown in the figure are coupled to the front frame 108 on the lateral sides thereof so as to hold the main frame 102 in front of the odd eye of the observer. Other features are similar to those of the foregoing binocular configuration shown in FIGS. 27, 28 and thus explanation about them is omitted here.

Next, in reference to FIG. 30, descriptions will be made of a configuration in which the image observation optical system according to the present invention is incorporated into an eyepiece optical system 59 of an electronic camera 40. In this example, an object image by a photographing objective optical system 48 disposed on a photographing path is formed on an image pickup surface 50 of a CCD 49 via a filter 51. The object image received by the CCD 49 is displayed, via a processor 52, on a liquid crystal display element (LCD) 5, as an electronic image. The processor 52 controls also a recording element 61, which records the photographed object image on the CCD 49 as electronic information. The displayed image on the LCD 5 is introduced to an eye E of an observer via the eyepiece optical system 59. The eyepiece optical system 59 includes a decentered prism optical system having the same configuration as the observation optical system of any embodiment (in this example, FIG. 1 configuration) of the present invention and a cover lens 11 disposed on the exit pupil side. Behind the LCD, a backlight 92 is disposed to illuminate it. In the illustrated example, the photographing objective optical system 48 includes a cover member 48a, a stop 48b, a first prism 48c, and a second prism 48d.

Since the photographing objective optical system 48 and the eyepiece optical system 59 can be constructed of a small number of optical members in the camera 40 having the above-described configuration, high performance and cost reduction can be achieved. Also, since the entire optical system can be arranged on a same plane, thickness in the direction perpendicular to this plane can be reduced.

Figure 31A:
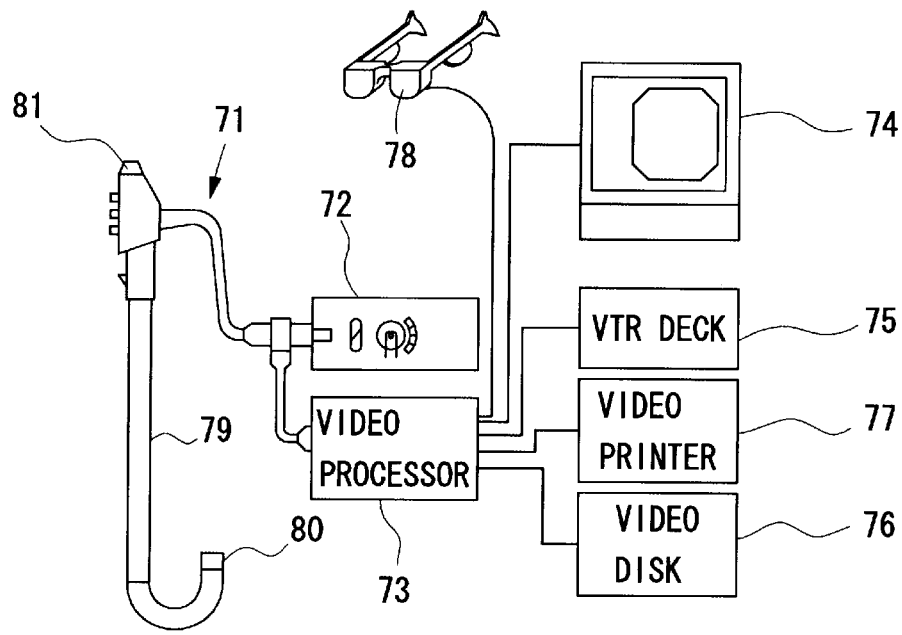
FIG. 31A is a schematic view of an electronic endoscope system having an electronic endoscope to which the image observation optical system according to the present invention is applied.
Figure 31B:
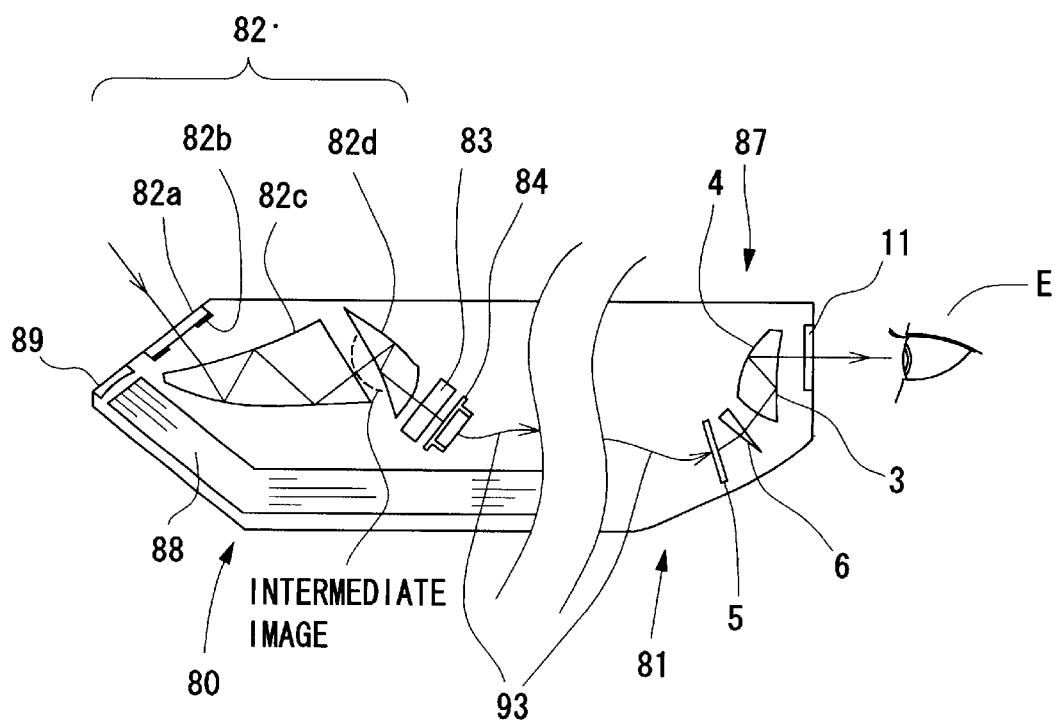
FIG. 31B is a schematic view showing the configuration inside the electronic endoscope of FIG. 31A.

Next, in reference to FIGS. 31A–31B, description will be made of an application example where the image observation optical system according to the present invention is incorporated into an eyepiece optical system 87 of an observation system of an electronic endoscope 71 in an electronic endoscope system.

In this example, the eyepiece optical system 87 employs an optical system which is configured to be same as any embodiment (in this case, the configuration of FIG. 1) of the present invention described above. As shown in FIG. 31A, the electronic endoscope system includes an electronic endoscope 71, a light source unit 72 which provides illumination light, a video processor 73 which performs signal processing in response to the electronic endoscope 71, a monitor 74 which displays a video signal outputted from the video processor 73, a VTR deck 75 and a video disk 76 which are connected with the video processor 73 and which record the video signal, a video printer 77 which prints out the video signal as an image, and a head-mount type image display apparatus (HMD) 78 as shown, for example, in FIG. 27. In the electronic endoscope 71, a distal end section 80 of an inserting section 79 and an eyepiece section 81 are configured as shown in FIG. 31B.

A beam of rays emanating from the light source unit 72 is made to illuminate a portion under observation by an objective optical system 89 of an illumination system via a light guide fiber bundle 88. Rays reflected back from the portion under observation is formed as an object image by the objective optical system 82 of the observation system via a cover member 82a. The object image is formed on an image pickup surface of a CCD 84 via a filter 83 such as a low-pass filter and an infrared cut filter. The CCD 84 converts the object image into a video signal, which is, via the video processor 73 shown in FIG. 31A, directly displayed on the monitor 74 as it is, is recorded in the video deck 75 and the video disk 76, is printed out from the video printer 77 as an image, and is displayed on the image display element 101 (FIG. 28) of the HMD 78 to be provided for an observer who wears the HMD 78. Simultaneously, the video signal converted by the CCD 84 is displayed, as an electronic image, on a liquid crystal display element (LCD) 5 in the eyepiece section 81 via an image signal transmitter 93. The displayed image there is introduced to the eye E of an observer via the eyepiece optical system 87 constructed of the image observation optical system of the present invention. In the illustrated example, the objective optical system 82 for observation includes the cover member 82a, a stop 82b, a first prism 82c, and a second prism 82d.

The endoscope thus configured can be constructed of a small number of optical members and facilitates high performance and cost reduction.

Figure 32:
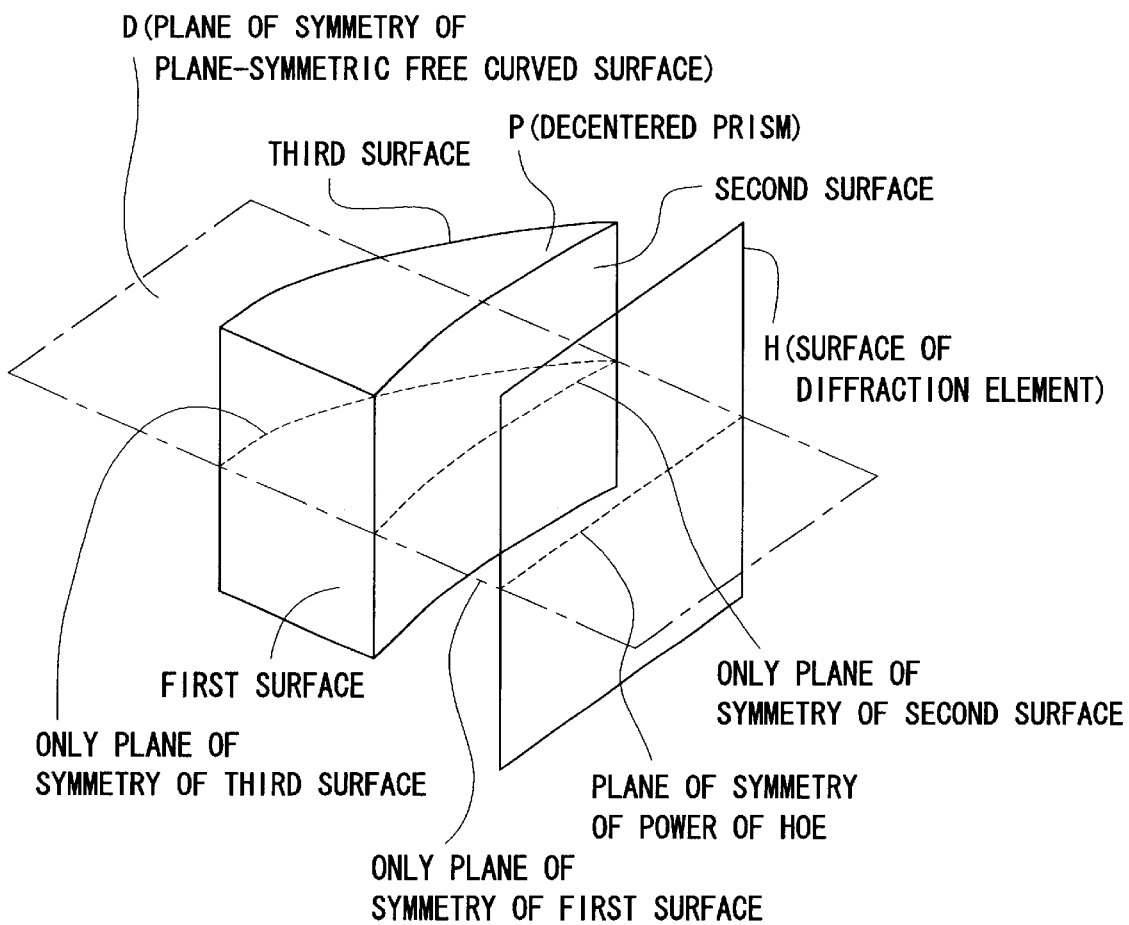
FIG. 32 shows a desirable arrangement of a HOE and a prism according to the present invention.
Figure 33:
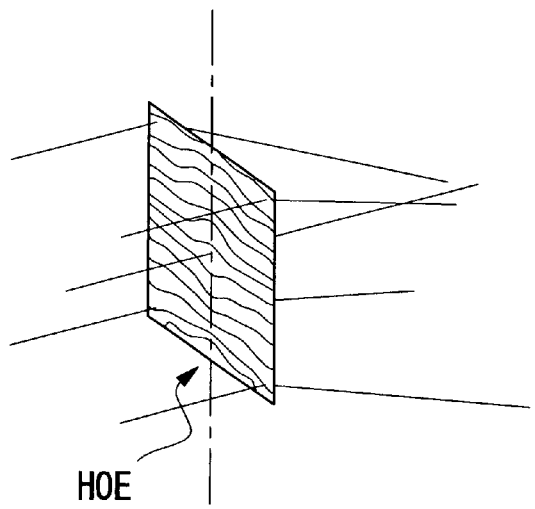
FIG. 33 is an explanatory view to show the power distribution of a diffraction element.
Figure 34:
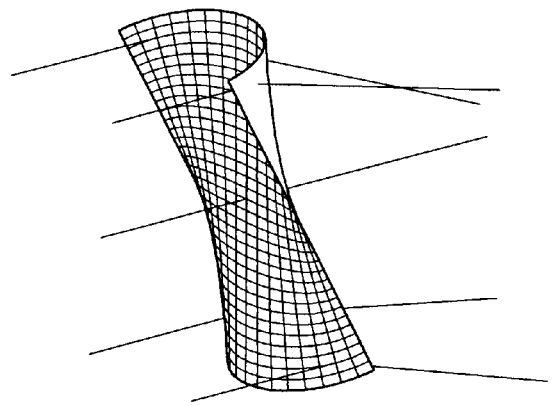
FIG. 34 is an explanatory view showing a free curved surface.
Figure 35A:
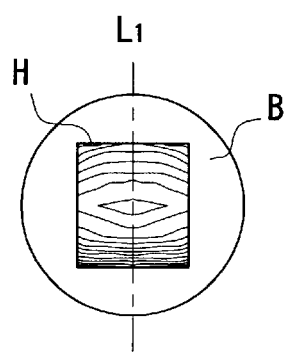
FIGS. 35A–35B show a HOE used in the present invention as applied to a prism, where
Figure 35B:
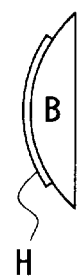
Figure 35C:
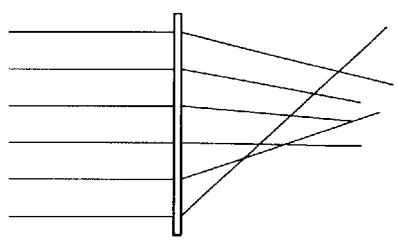
FIGS. 35C–35D are schematic views to show power of the HOE as arranged in the condition shown in FIG. 35A, where
Figure 35D:
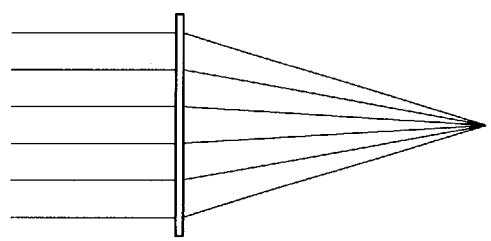

Next, a desirable arrangement in combining a diffraction element used as a HOE according to the present invention and a prism is shown in FIG. 32. In the drawing, a decentered prism P corresponds to the prism included in the image observation optical system of the present invention. In the case where a surface H of the diffraction element is shaped quadrangular as shown in the drawing, it is desirable, for beautiful image forming, to make arrangement so that a plane of symmetry D of a plane-symmetric free curved surface on the decentered prism P is parallel to at least one side of the quadrangular surface H of the diffraction element.

Furthermore, if the surface H of the diffraction element forms a regular square or a rectangle with all of its interior angles being substantially 90°, it is desirable to make arrangement so that the plane of symmetry D of the plane-symmetric free curved surface is parallel to two opposite sides of the surface H and that the plane of symmetry D coincides with a horizontal or vertical plane of symmetry of the surface H of the diffraction element. Such an arrangement facilitates assembly accuracy and thus is effective for mass production.

Furthermore, if a plurality or all of optical surfaces constituting the decentered prism P such as the first surface, the second surface, and the third surface are plane-symmetric free curved surfaces, it is desirable, in view of design convenience and in aberration performance also, to make arrangement so that the planes of symmetry of all of the plane-symmetric surfaces are arranged on the common plane D. It is also desirable to satisfy the above-mentioned relationship between the plane of symmetry D and a plane of symmetry of power of HOE of the diffraction element.

As discussed above, according to the present invention, the optical system can be made compact enough to be usable as an image display apparatus for a cellular phone or a portable intelligent terminal, and can achieve high image definition and wide field angle while controlling chromatic aberration of magnification to be small.

What is claimed is:

1. An image observation optical system comprising:
    an image display element; and
    an eyepiece optical system which introduces an image displayed on said image display element to an observer side without forming an intermediate image, so as to allow an observer to observe said image as a virtual image,
    wherein said eyepiece optical system is constructed and arranged to bend an optical axis using reflecting surfaces so as to be compact, said optical axis lying in a plane,
    wherein said eyepiece optical system is symmetrically formed with respect to said plane and includes an optical element having an entrance surface, a plurality of curved reflecting surfaces and an exit surface, at least one of said reflecting surfaces being provided with a volume hologram (HOE), and
    wherein said eyepiece optical system comprises a prism with a positive refracting power, and, upon an image position F0 at a midpoint, an image position Fb at one end point showing a larger chromatic aberration of magnification, and an image position Fa at another end point showing a smaller chromatic aberration of magnification being defined on a segment that is an intersection formed by said plane of symmetry of said eyepiece optical system and an image display surface, said image observation optical system satisfies the following conditions simultaneously:

$-1 < \phi y(HOE, Fa)/\phi y(Total) < 2$ $-1 < \phi y(HOE, Fb)/\phi y(Total) < 1$ where $\phi y$ (HOE, Fa) is a y-direction power of said HOE at the image position Fa, $\phi y$ (HOE, Fb) is a y-direction power of said HOE at the image position Fb, and $\phi y$ (Total) is a y-direction power of an entire system.

2. An image observation optical system according to claim 1, wherein said eyepiece optical system is configured as a prism optical system having at least two reflecting surfaces, said HOE has one or two plane of symmetry of power, and said plane of symmetry of said HOE coincides with a plane of symmetry of a shape of a base on which said HOE is provided.

3. An image observation optical system according to claim 2, wherein every X-direction power of said HOE is positive.

4. An image observation optical system according to claim 2, wherein said prism has at least one reflecting surface, and said HOE is formed on a surface of said prism.

5. An image observation optical system according to claim 2, wherein said prism has at least one reflecting surface, and said HOE is configured to have a rotationally asymmetric power so as to compensate rotationally asymmetric chromatic aberration of magnification at a position between said image display element and a pupil of the observer.

6. An image observation optical system according to claim 1, further satisfying the following conditions simultaneously:

$0 < \phi y(HOE, Fa)/\phi y(Total) < 1$ $-0.5 < \phi y(HOE, Fb)/\phi y(Total) < 0.5$.

7. An image observation optical system according to claim 6, further satisfying the following conditions simultaneously:

$0.005 < \phi y(HOE, Fa)/\phi y(Total) < 0.4$ $-0.2 < \phi y(HOE, Fb)/\phi y(Total) < 0.2$.

8. An image observation optical system according to claim 1, wherein said eyepiece optical system is configured as a prism optical system and every X-direction power of said HOE is positive.

9. An image observation optical system according to claim 1, wherein said prism has at least one reflecting surface and said HOE is formed on a surface of said prism.

10. An image observation optical system according to claim 1, wherein said prism has at least one reflecting surface, and said HOE is configured to have a rotationally asymmetric power so as to compensate rotationally asymmetric chromatic aberration of magnification at a position between said image display element and a pupil of the observer.

* * * * *

UNITED STATES PATENT AND TRADEMARK OFFICE
CERTIFICATE OF CORRECTION

PATENT NO. : 6,650,448 B2
DATED : November 18, 2003
INVENTOR(S) : Tohru Nakamura It is certified that error appears in the above-identified patent and that said Letters Patent is hereby corrected as shown below:

<u>Title page,</u>
Item [22], PCT Filed, replace "March 16, 2001" with -- December 28, 2000 --.

Signed and Sealed this

Eighteenth Day of May, 2004

JON W. DUDAS
*Acting Director of the United States Patent and Trademark Office*